(12) United States Patent
Nozaki

(10) Patent No.: US 12,475,748 B2
(45) Date of Patent: Nov. 18, 2025

(54) OPERATING DEVICE OF HUMAN-POWERED VEHICLE

(71) Applicant: SHIMANO INC., Sakai (JP)

(72) Inventor: Akihiro Nozaki, Sakai (JP)

(73) Assignee: SHIMANO INC., Sakai (JP)

(*) Notice: Subject to any disclaimer, the term of this patent is extended or adjusted under 35 U.S.C. 154(b) by 179 days.

(21) Appl. No.: 18/455,649

(22) Filed: Aug. 25, 2023

(65) Prior Publication Data
US 2025/0069452 A1   Feb. 27, 2025

(51) Int. Cl.
| | | |
|---|---|---|
| G07C 5/08 | (2006.01) | |
| B62J 6/24 | (2020.01) | |
| B62J 43/20 | (2020.01) | |
| B62J 45/20 | (2020.01) | |
| B62M 25/08 | (2006.01) | |
| G08C 17/02 | (2006.01) | |

(52) U.S. Cl.
CPC .............. G07C 5/0825 (2013.01); B62J 6/24 (2020.02); B62J 43/20 (2020.02); B62J 45/20 (2020.02); B62M 25/08 (2013.01); G08C 17/02 (2013.01)

(58) Field of Classification Search
CPC ......... G07C 5/0825; B62J 45/20; B62J 43/20; B62J 6/24; B62M 25/08; G08C 17/02
See application file for complete search history.

(56) References Cited

U.S. PATENT DOCUMENTS

| | | | |
|---|---|---|---|
| 8,909,424 B2 | 12/2014 | Jordan et al. | |
| 10,011,222 B1* | 7/2018 | Wu | B60Q 3/283 |
| 11,492,063 B1* | 11/2022 | Obuchi | F15B 15/1447 |
| 11,780,529 B2* | 10/2023 | Kosaka | B62M 25/08 |
| | | | 74/488 |
| 11,981,391 B2* | 5/2024 | Kosaka | B62K 23/02 |
| 2007/0068332 A1 | 3/2007 | Fujii et al. | |
| 2017/0354012 A1* | 12/2017 | Bard | H05B 45/24 |
| 2021/0370792 A1* | 12/2021 | Sato | B60L 53/305 |

FOREIGN PATENT DOCUMENTS

TW    M514429 U    12/2015

* cited by examiner

*Primary Examiner* — Gertrude Arthur Jeanglaude
(74) *Attorney, Agent, or Firm* — MORI & WARD, LLP

(57) ABSTRACT

An operating device of a human-powered vehicle comprises a base structure, an operating member, and an output unit. The base structure is mountable to the human-powered vehicle. The operating member is movable relative to the base structure in response to a user input operation. The output unit is configured to output, in response to the user input operation, first information indicating that a remaining level of an electric power source is lower than a remaining-level threshold in a case where the remaining level is lower than the remaining-level threshold. The output unit is configured to be free of outputting, in response to the user input operation, second information indicating that the remaining level of the electric power source is higher than the remaining-level threshold in a case where the remaining level is higher than the remaining-level threshold.

15 Claims, 12 Drawing Sheets

OPERATING DEVICE OF HUMAN-POWERED VEHICLE

BACKGROUND

Technical Field

The present invention relates to an operating device of a human-powered vehicle.

Background Information

A human-powered vehicle includes an operating unit configured to operate an electric unit. The operating unit is configured to be powered by an electric power supply. The electric unit is configured to be powered by an electric power supply. One of objects of the present disclosure is to reduce power consumption while enabling the user to be informed of a remaining level of the electric power supply.

SUMMARY

In accordance with a first aspect of the present invention, an operating device of a human-powered vehicle comprises a base structure, an operating member, and an output unit. The base structure is mountable to the human-powered vehicle. The operating member is movable relative to the base structure in response to a user input operation. The output unit is configured to output, in response to the user input operation, first information indicating that a remaining level of an electric power source is lower than a remaining-level threshold in a case where the remaining level is lower than the remaining-level threshold. The output unit is configured to be free of outputting, in response to the user input operation, second information indicating that the remaining level of the electric power source is higher than the remaining-level threshold in a case where the remaining level is higher than the remaining-level threshold.

With the electric device according to the first aspect, it is possible to inform via the output unit the user the first information indicating that the remaining level of the electric power source is lower than the remaining-level threshold. Furthermore, it is possible to omit a process to inform the user of the second information in the case where the remaining level is higher than the remaining-level threshold. Accordingly, it is possible to reduce power consumption of the operating device while enabling the user to be informed that the remaining level of the electric power source is lower than the remaining-level threshold.

In accordance with a second aspect of the present invention, the operating device according to the first aspect is configured so that the output unit includes an indicator. The indicator is configured to indicate the first information in response to the user input operation in the case where the remaining level is lower than the remaining-level threshold. The indicator is configured to be free of indicating the second information in response to the user input operation in the case where the remaining level is higher than the remaining-level threshold.

With the electric device according to the second aspect, it is possible to reliably inform via the indicator the user of the first information that the remaining level of the electric power source is lower than the remaining-level threshold. Accordingly, it is possible to reduce power consumption of the operating device while enabling the user to be reliably informed that the remaining level of the electric power source is lower than the remaining-level threshold.

In accordance with a third aspect of the present invention, the operating device according to the second aspect is configured so that the indicator is configured to emit light to indicate the first information in response to the user input operation in the case where the remaining level is lower than the remaining-level threshold. The indicator is configured to be free of emitting light in response to the user input operation in the case where the remaining level is higher than the remaining-level threshold.

With the electric device according to the third aspect, it is possible to reliably inform via the indicator the user of the first information that the remaining level of the electric power source is lower than the remaining-level threshold. Accordingly, it is possible to reduce power consumption of the operating device while enabling the user to be more reliably informed that the remaining level of the electric power source is lower than the remaining-level threshold.

In accordance with a fourth aspect of the present invention, the operating device according to any one of the first to third aspects further comprises electronic controller circuitry electrically connected to the output unit to control the output unit based on the user input operation and the remaining level of the electric power source.

With the electric device according to the fourth aspect, it is possible to reliably control the output unit using the electronic controller circuitry.

In accordance with a fifth aspect of the present invention, the operating device according to any one of the first to fourth aspects further comprises a power source holder configured to hold the electric power source. The output unit is configured to output, in response to the user input operation, the first information indicating that the remaining level of the electric power source held by the power source holder is lower than the remaining-level threshold in the case where the remaining level is lower than the remaining-level threshold. The output unit is configured to be free of outputting, in response to the user input operation, the second information indicating that the remaining level of the electric power source held by the power source holder is higher than the remaining-level threshold in the case where the remaining level is higher than the remaining-level threshold.

With the electric device according to the fifth aspect, it is possible to inform via the output unit the user of the first information that the remaining level of the electric power source of the operating device is lower than the remaining-level threshold.

In accordance with a sixth aspect of the present invention, the operating device according to any one of the first to fifth aspects further comprises communicator circuitry configured to transmit a control signal to an electric device in response to the user input operation.

With the electric device according to the sixth aspect, it is possible to control the electric device using the user input operation and the control signal.

In accordance with a seventh aspect of the present invention, the operating device according to the sixth aspect is configured so that the communicator circuitry includes a wireless communicator. The wireless communicator is configured to wirelessly transmit the control signal to the electric device in response to the user input operation.

With the electric device according to the seventh aspect, it is possible to omit an electric cable connecting the operating device and the electric device.

In accordance with an eighth aspect of the present invention, the operating device according to the seventh aspect is configured so that the electric device includes the electric power source. The wireless communicator is configured to wirelessly receive remaining-level information relating to the remaining level of the electric power source of the electric device.

With the electric device according to the eighth aspect, it is possible to inform via the output unit the user of the first information that the remaining level of the electric power source of the electric device is lower than the remaining-level threshold. Accordingly, it is possible to reduce power consumption of the operating device while enabling the user to be informed that the remaining level of the electric power source of the electric device is lower than the remaining-level threshold.

In accordance with a ninth aspect of the present invention, an operating device of a human-powered vehicle comprises a base structure, an operating member, a wireless communicator, and an output unit. The base structure is mountable to the human-powered vehicle. The operating member is movable relative to the base structure in response to a user input operation. The wireless communicator is configured to wirelessly transmit a control signal to an electric device in response to the user input operation. The wireless communicator is configured to wirelessly receive remaining-level information relating to a remaining level of an electric power source of the electric device. The output unit is configured to output, in response to the user input operation, information indicating the remaining level of the electric power source.

With the electric device according to the ninth aspect, it is possible to inform via the output unit the user of the remaining level of the electric power source of the electric device.

In accordance with a tenth aspect of the present invention, the operating device according to the ninth aspect is configured so that the output unit is configured to output, in response to the user input operation, first information indicating that the remaining level of the electric power source is lower than the remaining-level threshold in a case where the remaining level is lower than the remaining-level threshold.

With the electric device according to the tenth aspect, it is possible to inform via the output unit the user of the first information indicating that the remaining level of the electric power source is lower than the remaining-level threshold.

In accordance with an eleventh aspect of the present invention, the operating device according to the ninth or tenth aspect is configured so that the output unit is configured to output, in response to the user input operation, second information indicating that the remaining level of the electric power source is higher than the remaining-level threshold in a case where the remaining level is higher than the remaining-level threshold.

With the electric device according to the eleventh aspect, it is possible to inform via the output unit the user of the second information indicating that the remaining level of the electric power source is higher than the remaining-level threshold.

In accordance with a twelfth aspect of the present invention, the operating device according to any one of the eighth to tenth aspects is configured so that the wireless communicator is configured to wirelessly receive a signal including the remaining-level information from the electric device.

With the electric device according to the twelfth aspect, it is possible to obtain the remaining-level information from the electric device using the signal wirelessly transmitted from the electric device. Thus, it is possible to reliably inform via the output unit the user of the remaining level of the electric power source of the electric device.

In accordance with a thirteenth aspect of the present invention, the operating device according to the twelfth aspect is configured so that the wireless communicator is configured to wirelessly receive the signal which is wirelessly transmitted from the electric device in response to the control signal.

With the electric device according to the thirteenth aspect, it is possible to obtain the remaining-level information from the electric device using the signal wirelessly transmitted from the electric device every time the operating member receives the user input operation. Thus, it is possible to inform more reliably via the output unit the user of the remaining level of the electric power source of the electric device.

In accordance with a fourteenth aspect of the present invention, the operating device according to any one of the eighth to thirteenth aspects is configured so that the electric device includes a gear changer including the electric power source. The wireless communicator is configured to wirelessly receive the remaining-level information relating to the remaining level of the electric power source of the gear changer.

With the electric device according to the fourteenth aspect, it is possible to inform via the output unit the user of the remaining-level information of the electric power source of the gear changer.

In accordance with a fifteenth aspect of the present invention, the operating device according to the fourteenth aspect is configured so that the gear changer includes a rear derailleur including the electric power source. The wireless communicator is configured to wirelessly receive the remaining-level information relating to the remaining level of the electric power source of the rear derailleur.

With the electric device according to the fifteenth aspect, it is possible to inform via the output unit the user of the remaining-level information of the electric power source of the rear derailleur.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
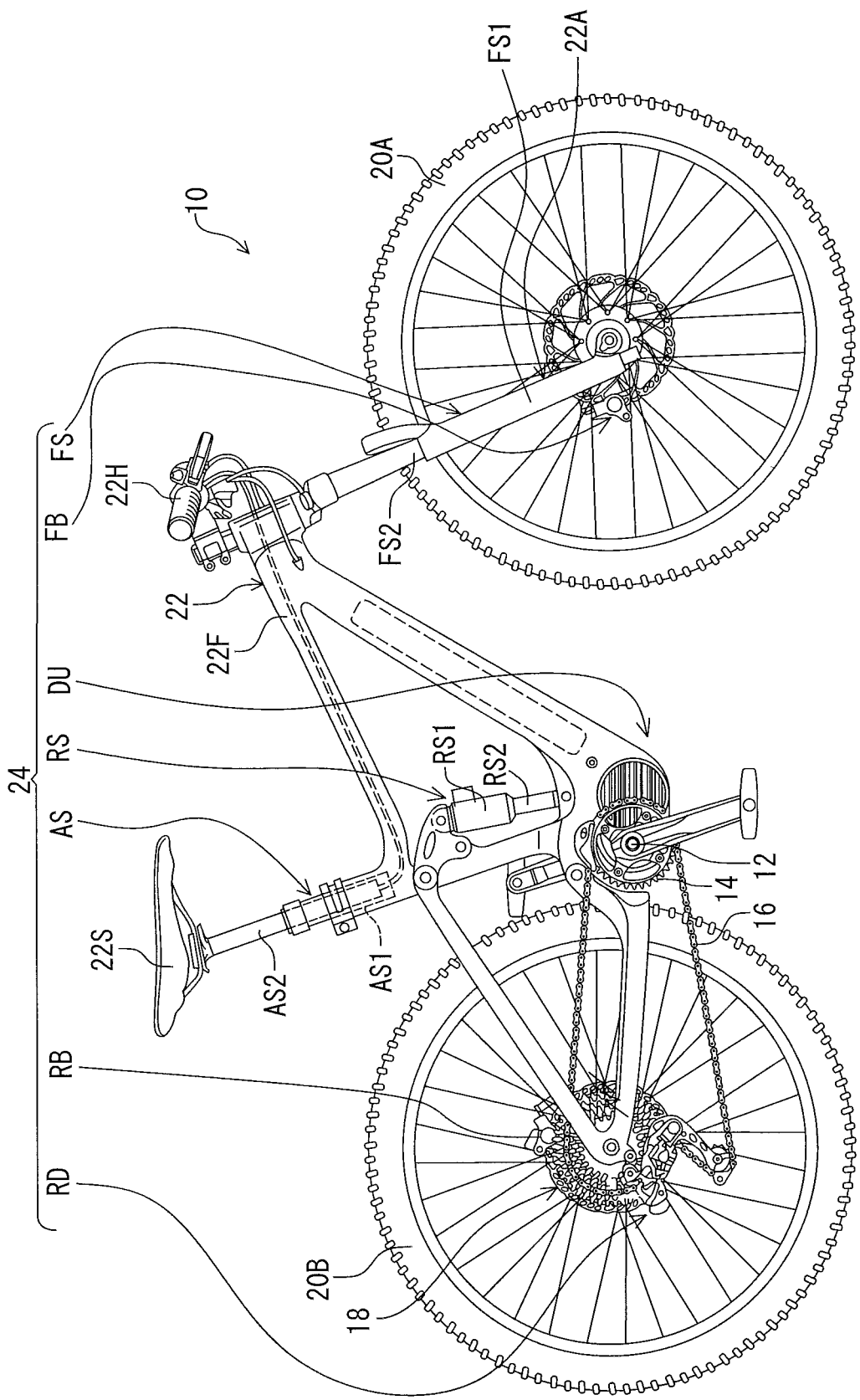
FIG. 1 is a side elevational view of a human-powered vehicle including a control system in accordance with one of embodiments.

The embodiments will now be described with reference to the accompanying drawings, wherein like reference numerals designate corresponding or identical elements throughout the various drawings.

As seen in FIG. 1, a human-powered vehicle 10 includes a crank 12, a sprocket 14, a chain 16, a sprocket assembly 18, a wheel 20A, a wheel 20B, and a vehicle body 22. The vehicle body 22 includes, for example, a frame 22F, a handlebar 22H, a front fork 22A, and a saddle 22S. The crank 12 is rotatably coupled to the vehicle body 22. The crank 12 is rotatable relative to the vehicle body 22 during pedaling. The sprocket 14 is coupled to the crank 12. The sprocket assembly 18 is rotatably coupled to the vehicle body 22. The chain 16 is engaged with the sprocket 14 and the sprocket assembly 18. The sprocket assembly 18 is coupled to the wheel 20A to transmit a pedaling force from the crank 12 to the wheel 20A via the sprocket 14 and the chain 16. The sprocket 14 can include at least two sprockets if needed or desired.

As seen in FIG. 1, the human-powered vehicle 10 includes a control system 24. The control system 24 of the human-powered vehicle 10 comprises an electric device RD. The electric device RD is configured to be mounted to the vehicle body 22 of the human-powered vehicle 10.

The electric device RD includes a gear changer. The electric device RD is configured to change a gear ratio of the human-powered vehicle 10. The gear ratio is a ratio of a rotational speed of the sprocket assembly 18 to a rotational speed of the sprocket 14. The electric device RD is configured to shift the chain 16 relative to the sprocket assembly 18. In the present embodiment, the gear changer includes a rear derailleur. However, the electric device RD can include another type of gear changer if needed or desired. Examples of another type of gear changer include a front derailleur and an internal-gear hub.

As seen in FIG. 1, the electric device RD further comprises a base member RD1 and a movable member RD2. The base member RD1 is mountable to the vehicle body 22 of the human-powered vehicle 10. The movable member RD2 is movable relative to the base member RD1. For example, the movable member RD2 includes a chain guide and a linkage. The chain guide is contactable with the chain 16. The linkage movably couples the base member RD1 and the chain guide. The electric actuator RD3 is at least partially provided to at least one of the base member RD1 and the movable member RD2.

Figure 2:
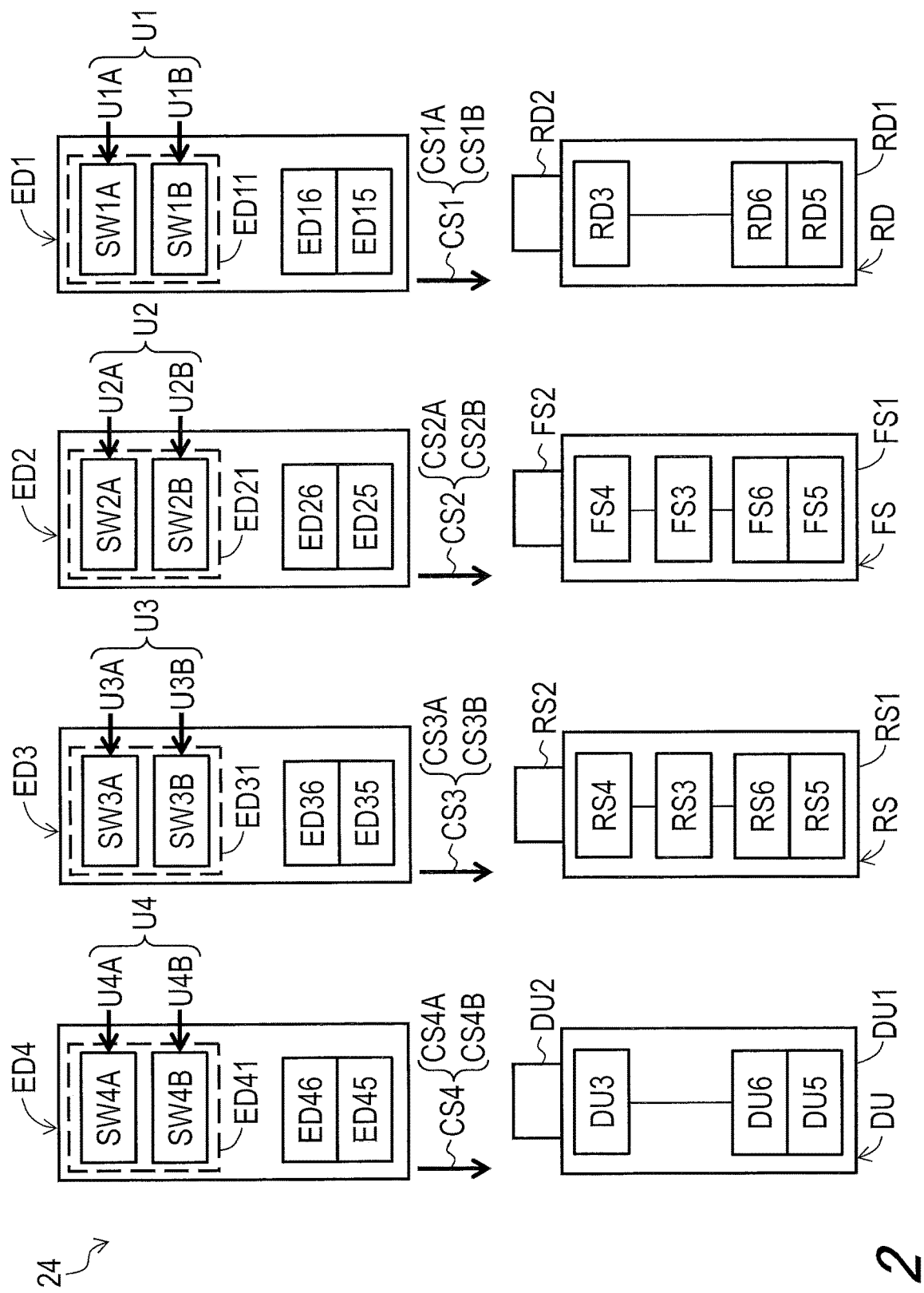
FIGS. 2 and 3 are schematic block diagrams of the control system of the human-powered vehicle illustrated in FIG. 1.

As seen in FIG. 2, the electric device RD of the human-powered vehicle 10 comprises an electric actuator RD3. The electric actuator RD3 is configured to generate an actuation force. Examples of the electric actuator RD3 include an electric motor. The electric actuator RD3 is coupled to at least one of the base member RD1 and the movable member RD2 to move the movable member RD2 relative to the base member RD1.

The electric device RD includes an electric power source RD5. The gear changer includes the electric power source RD5. The rear derailleur includes the electric power source RD5. For example, the electric power source RD5 includes a battery. Examples of the battery include a primary battery and a secondary battery. The electric device RD includes a power source holder RD6. The power source holder RD6 is configured to detachably and reattachably hold the electric power source RD5.

The power source holder RD6 is electrically connected to the electric actuator RD3. The electric power source RD5 is configured to supply electricity to the electric actuator RD3 via the power source holder RD6.

As seen in FIG. 1, the control system 24 of the human-powered vehicle 10 comprises an electric device FS. The electric device FS is configured to be mounted to the vehicle body 22 of the human-powered vehicle 10.

The electric device FS includes a suspension. The electric device FS is configured to absorb shocks or vibrations generated by riding on rough terrain. The electric device FS is installed in the front fork 22A. The electric device FS is configured to absorb shocks or vibrations transmitted from the wheel 20A. The electric device FS includes a first longitudinal member FS1 and a second longitudinal member FS2. The first longitudinal member FS1 and the second longitudinal member FS2 are relatively movable.

As seen in FIG. 2, the electric device FS of the human-powered vehicle 10 comprises an electric actuator FS3. The electric actuator FS3 is configured to generate an actuation force. Examples of the electric actuator FS3 include an electric motor.

The electric device FS includes a state changing structure FS4 configured to change the state of the electric device FS between a first state and a second state. The electric actuator FS3 is configured to actuate the state changing structure FS4 to change the state of the electric device FS between the first state and the second state. For example, the state changing structure FS4 includes a valve unit.

For example, the state changing structure FS4 is configured to allow the first longitudinal member FS1 and the second longitudinal member FS2 to relatively move in the first state. The state changing structure FS4 is configured to restrict the first longitudinal member FS1 and the second longitudinal member FS2 from relatively moving in the second state.

The electric device FS includes an electric power source FS5. For example, the electric power source FS5 includes a battery. Examples of the battery include a primary battery and a secondary battery. The electric device FS includes a power source holder FS6. The power source holder FS6 is configured to detachably and reattachably hold the electric power source FS5.

The power source holder FS6 is electrically connected to the electric actuator FS3. The electric power source FS5 is configured to supply electricity to the electric actuator FS3 via the power source holder FS6.

As seen in FIG. 1, the control system 24 of the human-powered vehicle 10 comprises an electric device RS. The electric device RS is configured to be mounted to the vehicle body 22 of the human-powered vehicle 10.

The electric device RS includes a suspension. The electric device RS is configured to absorb shocks or vibrations generated by riding on rough terrain. The electric device RS is configured to absorb shocks or vibrations transmitted from the wheel 20B. The electric device RS includes a first longitudinal member RS1 and a second longitudinal member RS2. The first longitudinal member RS1 and the second longitudinal member RS2 are relatively movable.

As seen in FIG. 2, the electric device RS of the human-powered vehicle 10 comprises an electric actuator RS3. The electric actuator RS3 is configured to generate an actuation force. Examples of the electric actuator RS3 include an electric motor.

The electric device RS includes a state changing structure RS4 configured to change the state of the electric device RS between a first state and a second state. The electric actuator RS3 is configured to actuate the state changing structure RS4 to change the state of the electric device RS between the first state and the second state. For example, the state changing structure RS4 includes a valve unit.

The state changing structure RS4 is configured to allow the first longitudinal member RS1 and the second longitudinal member RS2 to relatively move in the first state. The state changing structure RS4 is configured to restrict the first longitudinal member RS1 and the second longitudinal member RS2 from relatively moving in the second state.

The electric device RS includes an electric power source RS5. For example, the electric power source RS5 includes a battery. Examples of the battery include a primary battery and a secondary battery. The electric device RS includes a power source holder RS6. The power source holder RS6 is configured to detachably and reattachably hold the electric power source RS5.

The power source holder RS6 is electrically connected to the electric actuator RS3. The electric power source RS5 is configured to supply electricity to the electric actuator RS3 via the power source holder RS6.

As seen in FIG. 1, the control system 24 of the human-powered vehicle 10 comprises an electric device DU. The electric device DU is configured to be mounted to the vehicle body 22 of the human-powered vehicle 10.

The electric device DU includes an assist driving unit. The electric device DU is configured to assist propulsion of the human-powered vehicle 10. The electric device DU is configured to change an assist ratio depending on a human power applied to the human-powered vehicle 10.

As seen in FIG. 2, the electric device DU of the human-powered vehicle 10 comprises an electric actuator DU3. The electric actuator DU3 is configured to generate an actuation force. Examples of the electric actuator DU3 include an electric motor. The electric actuator DU3 is configured to apply the actuation force to the human-powered vehicle 10 to assist propulsion of the human-powered vehicle 10.

The electric device DU includes an electric power source DU5. For example, the electric power source DU5 includes a battery. Examples of the battery include a primary battery and a secondary battery. The electric device DU includes a power source holder DU6. The power source holder DU6 is configured to detachably and reattachably hold the electric power source DU5.

The power source holder DU6 is electrically connected to the electric actuator DU3. The electric power source DU5 is configured to supply electricity to the electric actuator DU3 via the power source holder DU6.

As seen in FIG. 1, the control system 24 of the human-powered vehicle 10 comprises an electric device FB. The electric device FB is configured to be mounted to the vehicle body 22 of the human-powered vehicle 10.

The electric device FB includes a braking device. The electric device FB is configured to apply a braking force to the human-powered vehicle 10. The electric device FB is configured to apply a braking force to the wheel 20A.

Figure 3:
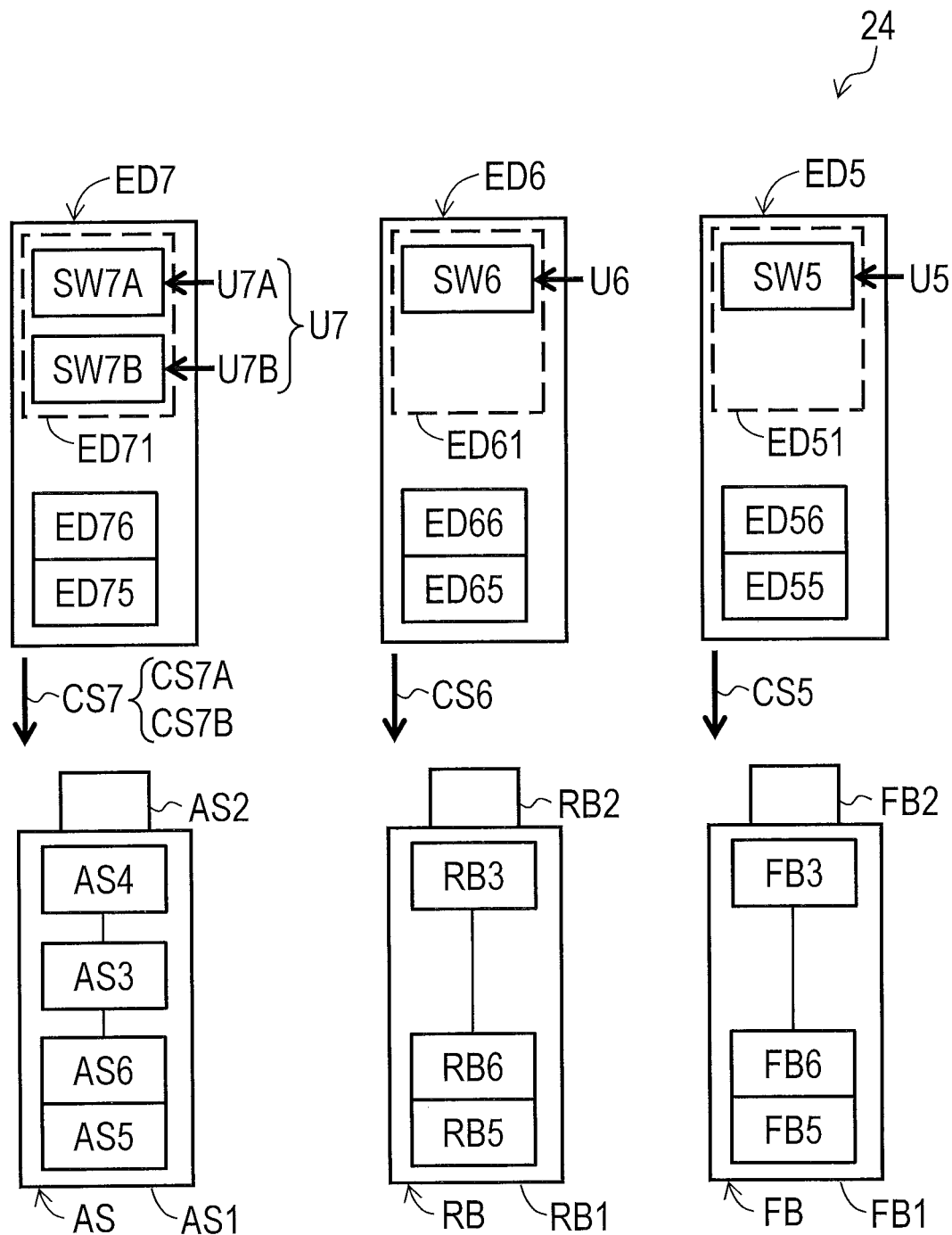

As seen in FIG. 3, the electric device FB of the human-powered vehicle 10 comprises a base member FB1, a brake pad FB2, and an electric actuator FB3. The electric actuator FB3 is configured to move the brake pad FB2 relative to the base member FB1. Examples of the electric actuator FB3 include an electric motor. The electric actuator FB3 is configured to apply the braking force to the human-powered vehicle 10 via the brake pad FB2.

The electric device FB includes an electric power source FB5. For example, the electric power source FB5 includes a battery. Examples of the battery include a primary battery and a secondary battery. The electric device FB includes a power source holder FB6. The power source holder FB6 is configured to detachably and reattachably hold the electric power source FB5.

The power source holder FB6 is electrically connected to the electric actuator FB3. The electric power source FB5 is configured to supply electricity to the electric actuator FB3 via the power source holder FB6.

As seen in FIG. 1, the control system 24 of the human-powered vehicle 10 comprises an electric device RB. The electric device RB is configured to be mounted to the vehicle body 22 of the human-powered vehicle 10.

The electric device RB includes a braking device. The electric device RB is configured to apply a braking force to the human-powered vehicle 10. The electric device RB is configured to apply a braking force to the wheel 20B.

As seen in FIG. 3, the electric device RB of the human-powered vehicle 10 comprises a base member RB1, a brake pad RB2, and an electric actuator RB3. The electric actuator RB3 is configured to move the brake pad RB2 relative to the base member RB1. Examples of the electric actuator RB3 include an electric motor. The electric actuator RB3 is configured to apply the braking force to the human-powered vehicle 10 via the brake pad RB2.

The electric device RB includes an electric power source RB5. For example, the electric power source RB5 includes a battery. Examples of the battery include a primary battery and a secondary battery. The electric device RB includes a power source holder RB6. The power source holder RB6 is configured to detachably and reattachably hold the electric power source RB5.

The power source holder RB6 is electrically connected to the electric actuator RB3. The electric power source RB5 is configured to supply electricity to the electric actuator RB3 via the power source holder RB6.

As seen in FIG. 1, the control system 24 of the human-powered vehicle 10 comprises an electric device AS. The electric device AS is configured to be mounted to the vehicle body 22 of the human-powered vehicle 10.

The electric device AS includes an adjustable seatpost. The electric device AS is configured to change a height of the saddle 22S relative to the frame 22F. The electric device 32 has an adjustable state and a locked state. The electric device 32 allows the user to change the height of the saddle 22S in the adjustable state. The electric device 32 is locked to maintain the height of the saddle 22S in the locked state. The electric device 32 is configured to change the state of the electric device 32 between the adjustable state and the locked state. The electric device AS includes a first longitudinal member AS1 and a second longitudinal member AS2. The first longitudinal member AS1 and the second longitudinal member AS2 are relatively movable.

As seen in FIG. 3, the electric device AS of the human-powered vehicle 10 comprises an electric actuator AS3. The electric actuator AS3 is configured to generate an actuation force. Examples of the electric actuator AS3 include an electric motor. The actuation force changes the state of the electric device AS between the first state and the second state.

The electric device AS includes a state changing structure AS4 configured to change the state of the electric device AS between the adjustable state and the locked state. The electric actuator AS3 is configured to actuate the state changing structure AS4 to change the state of the electric device AS between the adjustable state and the locked state. For example, the state changing structure AS4 includes a valve unit.

The state changing structure AS4 is configured to allow the first longitudinal member AS1 and the second longitudinal member AS2 to relatively move in the adjustable state. The state changing structure AS4 is configured to restrict the first longitudinal member AS1 and the second longitudinal member AS2 from relatively moving in the locked state.

The electric device AS includes an electric power source AS5. For example, the electric power source AS5 includes a battery. Examples of the battery include a primary battery and a secondary battery. The electric device AS includes a power source holder AS6. The power source holder AS6 is configured to detachably and reattachably hold the electric power source AS5.

The power source holder AS6 is electrically connected to the electric actuator AS3. The electric power source AS5 is configured to supply electricity to the electric actuator AS3 via the power source holder AS6.

The human-powered vehicle 10 can include another electric device other than the electric devices RD, FS, RS, DU, FB, RB, and AS if needed or desired. At least one of the electric devices RD, FS, RS, DU, FB, RB, and AS can be omitted from the human-powered vehicle 10 if needed or desired.

As seen in FIG. 2, the control system 24 of the human-powered vehicle 10 comprises an operating device ED1. The operating device ED1 is configured to be mounted to the vehicle body 22 of the human-powered vehicle 10. The operating device ED1 is configured to operate the electric device RD. The operating device ED1 can be mounted to parts other than the handlebar 22H if needed or desired.

The operating device ED1 of the human-powered vehicle 10 comprises a user interface ED11. The user interface ED11 is configured to receive a user input operation U1. The user input operation U1 includes at least one of user input operations U1A and U1B. For example, the user interface ED11 includes an electric switch SW1A configured to be activated by the user input operation U1A received by the operating member ED13A. The user interface ED11 includes an electric switch SW1B configured to be activated by the user input operation U1B received by the operating member ED13B. The user input operation U1A includes pressing of the operating member ED13A or the electric switch SW1A. The user input operation U1B includes pressing of the operating member ED13B or the electric switch SW1B. The user interface ED11 can include structures other than the electric switch SW1A or SW1B if needed or desired. One of the electric switches SW1A and SW1B can be omitted from the user interface ED11 if needed or desired.

The user input operation U1 includes concurrent receipts of the user input operations U1A and U1B. The user input operation U1 includes concurrent presses of the electric switches SW1A and SW1B. The user input operation U1 includes a normal press, a long press, or multiple presses of the operating member ED13A or the electric switch SW1A. The user input operation U1 includes a normal press, a long press, or multiple presses of the operating member ED13B or the electric switch SW1B.

The operating device ED1 is configured to operate the electric device RS in response to the user input operation U1. The operating device ED1 is configured to generate a control signal CS1 in response to the user input operation U1. The control signal CS1 includes at least one of control signals CS1A and CS1B. The operating device ED1 is configured to generate the control signal CS1A in response to the user input operation U1A. The operating device ED1 is configured to generate the control signal CS1B in response to the user input operation U1B. The operating device ED1 can include a single operating device or at least two separate operating devices.

The electric device RD is configured to change the gear ratio in response to the control signal CS1 generated by the operating device ED1. For example, the control signal CS1A indicates one of upshifting and downshifting of the electric device RD. The control signal CS1B indicates the other of upshifting and downshifting of the electric device RD. One of the control signals CS1A and CS1B can be omitted from the electric device RD if needed or desired.

The operating device ED1 comprises an electric power source ED15. The operating device ED1 further comprises a power source holder ED16. The power source holder ED16 is configured to hold the electric power source ED15. The power source holder ED16 is configured to detachably and reattachably hold the electric power source ED15. The electric power source ED15 is configured to be detachably and reattachably attached to the power source holder ED16. Examples of the electric power source ED15 includes a primary battery and a secondary battery.

As seen in FIG. 2, the control system 24 of the human-powered vehicle 10 comprises an operating device ED2. The operating device ED2 is configured to be mounted to the vehicle body 22 of the human-powered vehicle 10. The operating device ED2 is configured to operate the electric device FS. The operating device ED2 can be mounted to parts other than the handlebar 22H if needed or desired.

The operating device ED2 of the human-powered vehicle 10 comprises a user interface ED21. The user interface ED21 is configured to receive a user input operation U2. The user input operation U2 includes at least one of user input operations U2A and U2B. For example, the user interface ED21 includes an electric switch SW2A configured to be activated by the user input operation U2A received by the operating member ED23A. The user interface ED21 includes an electric switch SW2B configured to be activated by the user input operation U2B received by the operating member ED23B. The user input operation U2A includes pressing of the operating member ED23A or the electric switch SW2A. The user input operation U2B includes pressing of the operating member ED23B or the electric switch SW2B. The user interface ED21 can include structures other than the electric switch SW2A or SW2B if needed or desired. One of the electric switches SW2A and SW2B can be omitted from the user interface ED21 if needed or desired.

The user input operation U2 includes concurrent receipts of the user input operations U2A and U2B. The user input operation U2 includes concurrent presses of the electric switches SW2A and SW2B. The user input operation U2 includes a normal press, a long press, or multiple presses of the operating member ED23A or the electric switch SW2A. The user input operation U2 includes a normal press, a long press, or multiple presses of the operating member ED23B or the electric switch SW2B.

The operating device ED2 is configured to operate the electric device RS in response to the user input operation U2. The operating device ED2 is configured to generate a control signal CS2 in response to the user input operation U2. The control signal CS2 includes at least one of control signals CS2A and CS2B. The operating device ED2 is configured to generate the control signal CS2A in response to the user input operation U2A. The operating device ED2 is configured to generate the control signal CS2B in response to the user input operation U2B. The operating device ED2 can include a single operating device or at least two separate operating devices.

For example, the electric device FS is configured to absorb shocks or vibrations generated by riding on rough terrain in the first state. The electric device FS is configured to be free of absorbing shocks or vibrations generated by riding on rough terrain in the second state. The electric device FS can be configured to have a first stroke in the first state while the electric device FS can be configured to have a second stroke different from the first stroke in the second state. The electric device FS can be configured to have a first damper performance in the first state while the electric device FS can be configured to have a second damper performance different from the first damper performance in the second state.

The electric device FS is configured to change the state of the electric device FS between the first state and the second state in response to the control signal CS2. The electric device FS is configured to change the state of the electric device FS from the first state to the second state in response to the control signal CS2A. The electric device FS is configured to change the state of the electric device FS from the second state to the first state in response to the control signal CS2A. The control signal CS2A or CS2B indicates changing of the state of the electric device FS. One of the control signal CS2A and CS2B can be omitted from the electric device FS if needed or desired.

The operating device ED2 comprises an electric power source ED25. The operating device ED2 further comprises a power source holder ED26. The power source holder ED26 is configured to hold the electric power source ED25. The power source holder ED26 is configured to detachably and reattachably hold the electric power source ED25. The electric power source ED25 is configured to be detachably and reattachably attached to the power source holder ED26. Examples of the electric power source ED25 includes a primary battery and a secondary battery.

As seen in FIG. 2, the control system 24 of the human-powered vehicle 10 comprises an operating device ED3. The operating device ED3 is configured to be mounted to the vehicle body 22 of the human-powered vehicle 10. The operating device ED3 is configured to operate the electric device RS. The operating device ED3 can be mounted to parts other than the handlebar 22H if needed or desired.

The operating device ED3 of the human-powered vehicle 10 comprises a user interface ED31. The user interface ED31 is configured to receive a user input operation U3. The user input operation U3 includes at least one of user input operations U3A and U3B. For example, the user interface ED31 includes an electric switch SW3A configured to be activated by the user input operation U3A received by the operating member ED33A. The user interface ED31 includes an electric switch SW3B configured to be activated by the user input operation U3B received by the operating member ED33B. The user input operation U3A includes pressing of the operating member ED33A or the electric switch SW3A. The user input operation U3B includes pressing of the operating member ED33B or the electric switch SW3B. The user interface ED31 can include structures other than the electric switch SW3A or SW3B if needed or desired. One of the electric switches SW3A and SW3B can be omitted from the user interface ED31 if needed or desired.

The user input operation U3 includes concurrent receipts of the user input operations U3A and U3B. The user input operation U3 includes concurrent presses of the electric switches SW3A and SW3B. The user input operation U3 includes a normal press, a long press, or multiple presses of the operating member ED33A or the electric switch SW3A. The user input operation U3 includes a normal press, a long press, or multiple presses of the operating member ED33B or the electric switch SW3B.

The operating device ED3 is configured to operate the electric device RS in response to the user input operation U3. The operating device ED3 is configured to generate a control signal CS3 in response to the user input operation U3. The control signal CS3 includes at least one of control signals CS3A and CS3B. The operating device ED3 is configured to generate the control signal CS3A in response to the user input operation U3A. The operating device ED3 is configured to generate the control signal CS3B in response to the user input operation U3B. The operating device ED3 can include a single operating device or at least two separate operating devices.

For example, the electric device RS is configured to absorb shocks or vibrations generated by riding on rough terrain in the first state. The electric device RS is configured to be free of absorbing shocks or vibrations generated by riding on rough terrain in the second state. The electric device RS can be configured to have a first stroke in the first state while the electric device RS can be configured to have a second stroke different from the first stroke in the second state. The electric device RS can be configured to have a first damper performance in the first state while the electric device RS can be configured to have a second damper performance different from the first damper performance in the second state. The electric device RS is configured to change the state of the electric device RS from the first state to the second state in response to the control signal CS3A. The electric device RS is configured to change the state of the electric device RS from the second state to the first state in response to the control signal CS3B. The control signal CS3A or CS3B indicates changing of the state of the electric device RS. One of the control signal CS3A and CS3B can be omitted from the electric device RS if needed or desired.

The operating device ED3 comprises an electric power source ED35. The operating device ED3 further comprises a power source holder ED36. The power source holder ED36 is configured to hold the electric power source ED35. The power source holder ED36 is configured to detachably and reattachably hold the electric power source ED35. The electric power source ED35 is configured to be detachably and reattachably attached to the power source holder ED36. Examples of the electric power source ED35 includes a primary battery and a secondary battery.

As seen in FIG. 2, the control system 24 of the human-powered vehicle 10 comprises an operating device ED4. The operating device ED4 is configured to be mounted to the vehicle body 22 of the human-powered vehicle 10. The operating device ED4 is configured to operate the electric device DU. The operating device ED4 can be mounted to parts other than the handlebar 22H if needed or desired.

The operating device ED4 of the human-powered vehicle 10 comprises a user interface ED41. The user interface ED41 is configured to receive a user input operation U4. The user input operation U4 includes at least one of user input operations U4A and U4B. For example, the user interface ED41 includes an electric switch SW4A configured to be activated by the user input operation U4A received by the operating member ED43A. The user interface ED41 includes an electric switch SW4B configured to be activated by the user input operation U4B received by the operating member ED43B. The user input operation U4A includes pressing of the operating member ED43A or the electric switch SW4A. The user input operation U4B includes pressing of the operating member ED43B or the electric switch SW4B. The user interface ED41 can include structures other than the electric switch SW4A or SW4B if needed or desired. One of the electric switches SW4A and SW4B can be omitted from the user interface ED41 if needed or desired.

The user input operation U4 includes concurrent receipts of the user input operations U4A and U4B. The user input operation U4 includes concurrent presses of the electric switches SW4A and SW4B. The user input operation U4 includes a normal press, a long press, or multiple presses of the operating member ED43A or the electric switch SW4A. The user input operation U4 includes a normal press, a long press, or multiple presses of the operating member ED43B or the electric switch SW4B.

The operating device ED4 is configured to operate the electric device DU in response to the user input operation U4. The operating device ED4 is configured to generate a control signal CS4 in response to the user input operation U4. The control signal CS4 includes at least one of control signals CS4A and CS4B. The operating device ED4 is configured to generate the control signal CS4A in response to the user input operation U4A. The operating device ED4 is configured to generate the control signal CS4B in response to the user input operation U4B. The operating device ED4 can include a single operating device or at least two separate operating devices.

For example, the electric device DU is configured to change the assist ratio which is a ratio of the assist driving force to the human power applied to the human-powered vehicle 10 in response to the control signal CS4A or CS4B generated by the operating device ED4. The electric device DU includes at least two assist ratios. The electric device DU is configured to change the assist ratio between the at least two assist ratios in response to the control signal CS4A or CS4B. The electric device DU is configured to increase the assist ratio in response to the control signal CS4A. The electric device DU is configured to decrease the assist ratio in response to the control signal CS4B.

The operating device ED4 comprises an electric power source ED45. The operating device ED4 further comprises a power source holder ED46. The power source holder ED46 is configured to hold the electric power source ED45. The power source holder ED46 is configured to detachably and reattachably hold the electric power source ED45. The electric power source ED45 is configured to be detachably and reattachably attached to the power source holder ED46. Examples of the electric power source ED45 includes a primary battery and a secondary battery.

As seen in FIG. 3, the control system 24 of the human-powered vehicle 10 comprises an operating device ED5. The operating device ED5 is configured to be mounted to the vehicle body 22 of the human-powered vehicle 10. The operating device ED5 is configured to operate the electric device FB. The operating device ED5 can be mounted to parts other than the handlebar 22H if needed or desired.

The operating device ED5 of the human-powered vehicle 10 comprises a user interface ED51. The user interface ED51 is configured to receive a user input operation U5. For example, the user interface ED51 includes an electric switch SW5 configured to be activated by the user input operation U5. The user input operation U5 includes pressing of the electric switch SW5. The user interface ED51 can include structures other than the electric switch SW5 if needed or desired.

The operating device ED5 is configured to operate the electric device FB in response to the user input operation U5. The operating device ED5 is configured to generate a control signal CS5 in response to the user input operation U5. The operating device ED5 can include a single operating device or at least two separate operating devices. For example, the electric device FB is configured to apply the braking force to the human-powered vehicle 10 in response to the control signal CS5.

The operating device ED5 comprises an electric power source ED55. The operating device ED5 further comprises a power source holder ED56. The power source holder ED56 is configured to hold the electric power source ED55. The power source holder ED56 is configured to detachably and reattachably hold the electric power source ED55. The electric power source ED55 is configured to be detachably and reattachably attached to the power source holder ED56. Examples of the electric power source ED55 includes a primary battery and a secondary battery.

As seen in FIG. 3, the control system 24 of the human-powered vehicle 10 comprises an operating device ED6. The operating device ED6 is configured to be mounted to the vehicle body 22 of the human-powered vehicle 10. The operating device ED6 is configured to operate the electric device RB. The operating device ED6 can be mounted to parts other than the handlebar 22H if needed or desired.

The operating device ED6 of the human-powered vehicle 10 comprises a user interface ED61. The user interface ED61 is configured to receive a user input operation U6. For example, the user interface ED61 includes an electric switch SW6 configured to be activated by the user input operation U6. The user input operation U6 includes pressing of the electric switch SW6. The user interface ED61 can include structures other than the electric switch SW6 if needed or desired.

The operating device ED6 is configured to operate the electric device RB in response to the user input operation U6. The operating device ED6 is configured to generate a control signal CS6 in response to the user input operation U6. The operating device ED6 can include a single operating device or at least two separate operating devices. For example, the electric device RB is configured to apply the braking force to the human-powered vehicle 10 in response to the control signal CS6.

The operating device ED6 comprises an electric power source ED65. The operating device ED6 further comprises a power source holder ED66. The power source holder ED66 is configured to hold the electric power source ED65. The power source holder ED66 is configured to detachably and reattachably hold the electric power source ED65. The electric power source ED65 is configured to be detachably and reattachably attached to the power source holder ED66. Examples of the electric power source ED65 includes a primary battery and a secondary battery.

As seen in FIG. 3, the control system 24 of the human-powered vehicle 10 comprises an operating device ED7. The operating device ED7 is configured to be mounted to the vehicle body 22 of the human-powered vehicle 10. The operating device ED7 is configured to operate the electric device AS. The operating device ED7 can be mounted to parts other than the handlebar 22H if needed or desired.

The operating device ED7 of the human-powered vehicle 10 comprises a user interface ED71. The user interface ED71 is configured to receive a user input operation U7. The user input operation U7 includes at least one of user input operations U7A and U7B. For example, the user interface ED71 includes an electric switch SW7A configured to be activated by the user input operation U7A received by the operating member ED73A. The user interface ED71 includes an electric switch SW7B configured to be activated by the user input operation U7B received by the operating member ED73B. The user input operation U7A includes pressing of the operating member ED73A or the electric switch SW7A. The user input operation U7B includes pressing of the operating member ED73B or the electric switch SW7B. The user interface ED71 can include structures other than the electric switch SW7A or SW7B if needed or desired. One of the electric switches SW7A and SW7B can be omitted from the user interface ED71 if needed or desired.

The user input operation U7 includes concurrent receipts of the user input operations U7A and U7B. The user input operation U7 includes concurrent presses of the electric switches SW7A and SW7B. The user input operation U7 includes a normal press, a long press, or multiple presses of the operating member ED73A or the electric switch SW7A. The user input operation U7 includes a normal press, a long press, or multiple presses of the operating member ED73B or the electric switch SW7B.

The operating device ED7 is configured to operate the electric device AS in response to the user input operation U7. The operating device ED7 is configured to generate a control signal CS7 in response to the user input operation U7. The control signal CS7 includes at least one of control signals CS7A and CS7B. The operating device ED7 is configured to generate the control signal CS7A in response to the user input operation U7A. The operating device ED7 is configured to generate the control signal CS7B in response to the user input operation U7B. The operating device ED7 can include a single operating device or at least two separate operating devices.

For example, the electric device AS is configured to change the state of the electric device AS from the locked state to the adjustable state in response to the control signal CS7A. The electric device AS is configured to change the state of the electric device AS from the adjustable state to the locked state in response to the control signal CS7A. The control signal CS7A or CS7B indicates changing of the state of the electric device AS. One of the control signal CS7A and CS7B can be omitted from the electric device AS if needed or desired.

The operating device ED7 comprises an electric power source ED75. The operating device ED7 further comprises a power source holder ED76. The power source holder ED76 is configured to hold the electric power source ED75. The power source holder ED76 is configured to detachably and reattachably hold the electric power source ED75. The electric power source ED75 is configured to be detachably and reattachably attached to the power source holder ED76. Examples of the electric power source ED75 includes a primary battery and a secondary battery.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 10 with facing a handlebar or steering. Examples of the user's standard position include a saddle and a seat. Accordingly, these terms, as utilized to describe the electric devices RD, FS, RS, DU, FB, RB, and AS, the operating devices ED1, ED2, ED3, ED4, ED5, ED6, and ED7, or other devices, should be interpreted relative to the human-powered vehicle 10 equipped with the electric devices RD, FS, RS, DU, FB, RB, and AS, the operating devices ED1, ED2, ED3, ED4, ED5, ED6, and ED7, or other devices as used in an upright riding position on a horizontal surface.

In the present embodiment, the electric device RD and the operating device ED1 will be described in detail hereinafter. The structure of the electric device FS can be applied to each of the electric devices FS, RS, DU, FB, RB, and AS or other electric devices if needed or desired. The structure of the operating device ED1 can be applied to each of the operating devices ED2, ED3, ED4, ED5, ED6, and ED7.

Figure 4:
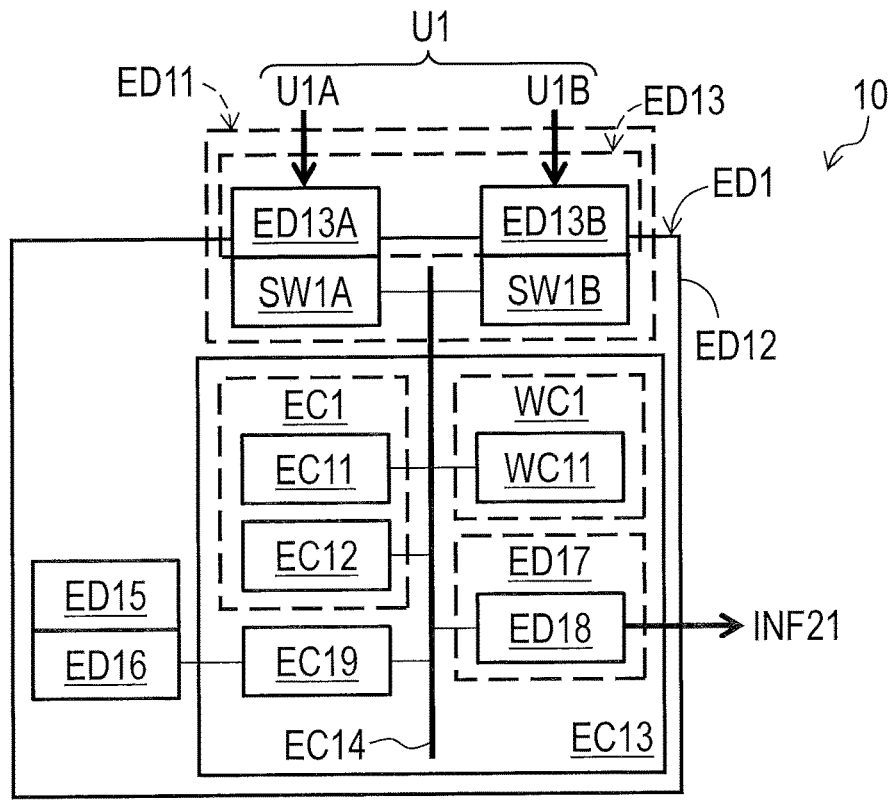
FIG. 4 is a schematic block diagram of an operating device and an electric device of the control system illustrated in FIG. 2 (in a case where a remaining level of an electric power source of the electric device is lower than or equal to a remaining-level threshold).
Figure 4:
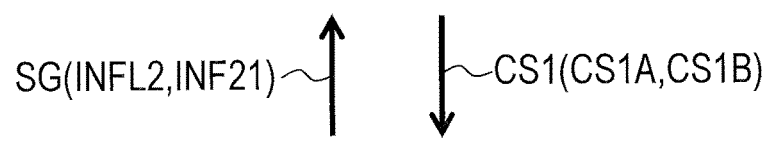
Figure 4:
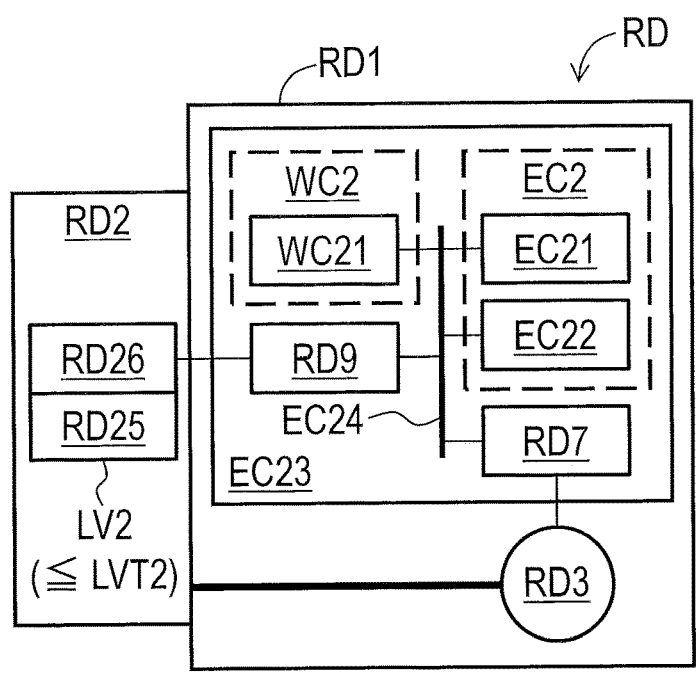

As seen in FIG. 4, the operating device ED1 of the human-powered vehicle 10 comprises a base structure ED12. The base structure ED12 is mountable to the human-powered vehicle 10. The base structure ED12 is mountable to the vehicle body 22 of the human-powered vehicle 10. The base structure ED12 is mountable to the handlebar 22H of the vehicle body 22. However, the base structure ED12 can be configured to be mountable to other parts of the human-powered vehicle 10 if needed or desired.

The user interface ED11 includes an operating member ED13. Namely, the operating device ED1 of the human-powered vehicle 10 comprises the operating member ED13. The operating member ED13 is movable relative to the base structure ED12 in response to the user input operation U1. The operating member ED13 is contactable with a user's finger when the user operates the operating device ED1.

In the present embodiment, the operating member ED13 includes operating members ED13A and ED13B. The operating member ED13A is movable relative to the base structure ED12 in response to the user input operation U1A. The operating member ED13B is movable relative to the base structure ED12 in response to the user input operation U1B.

The electric switch SW1A is configured to be activated in response to the user input operation U1A received by the operating member ED13A. The electric switch SW1A is coupled to the operating member ED13A to be activated in response to the user input operation U1A received by the operating member ED13A.

The electric switch SW1B is configured to be activated in response to the user input operation U1B received by the operating member ED13B. The electric switch SW1B is coupled to the operating member ED13B to be activated in response to the user input operation U1B received by the operating member ED13B.

As seen in FIG. 4, the operating device ED1 further comprises communicator circuitry WC1. The communicator circuitry WC1 is configured to transmit the control signal CS1 to the electric device RD in response to the user input operation U1. The communicator circuitry WC1 is configured to transmit the control signal CS1 to the electric device RD in response to the user input operation U1. The communicator circuitry WC1 is configured to transmit the control signal CS1A to the electric device RD in response to the user input operation U1A. The communicator circuitry WC1 is configured to transmit the control signal CS1B to the electric device RD in response to the user input operation U1B.

The electric device RD includes additional communicator circuitry WC2. The additional communicator circuitry WC2 is configured to communicate with the communicator circuitry WC1 of the operating device ED1. The additional communicator circuitry WC2 is configured to receive the control signal CS1 from the communicator circuitry WC1. The additional communicator circuitry WC2 is configured to receive at least one of the control signals CS1A and CS1B from the communicator circuitry WC1.

The communicator circuitry WC1 includes a wireless communicator WC11. Namely, the operating device ED1 of the human-powered vehicle 10 comprises the wireless communicator WC11. The wireless communicator WC11 is configured to wirelessly communicate with the electric device RD. The wireless communicator WC11 is configured to wirelessly transmit the control signal CS1 to the electric device RD in response to the user input operation U1. The wireless communicator WC11 is configured to wirelessly transmit the control signal CS1A to the electric device RD in response to the user input operation U1A. The wireless communicator WC11 is configured to wirelessly transmit the control signal CS1B to the electric device RD in response to the user input operation U1B.

In the present embodiment, the communicator circuitry WC1 includes the wireless communicator WC11. However, the communicator circuitry WC1 can include a wired communicator configured to communicate with another wired communicator via an electric cable instead of or in addition to the wireless communicator WC11 if needed or desired. The communicator circuitry WC1 can be configured to transmit the control signal CS1 to the additional communicator circuitry WC2 via an electric cable if needed or desired.

The additional communicator circuitry WC2 includes an additional wireless communicator WC21. Namely, the electric device RD of the human-powered vehicle 10 comprises the additional wireless communicator WC21. The additional wireless communicator WC21 is configured to wirelessly communicate with the electric device RD. The additional wireless communicator WC21 is configured to wirelessly receive the control signal CS1 from the operating device ED1. The additional wireless communicator WC21 is configured to wirelessly receive the control signal CS1A from the operating device ED1. The additional wireless communicator WC21 is configured to wirelessly receive the control signal CS1B from the operating device ED1.

In the present embodiment, the additional communicator circuitry WC2 includes the additional wireless communicator WC21. However, the additional communicator circuitry WC2 can include a wired communicator configured to communicate with another wired communicator via an electric cable instead of or in addition to the additional wireless communicator WC21 if needed or desired. The additional communicator circuitry WC2 can be configured to receive the control signal CS1 from the communicator circuitry WC1 via an electric cable if needed or desired.

As seen in FIG. 4, the operating device ED1 further comprises electronic controller circuitry EC1. The electronic controller circuitry EC1 is configured to control the communicator circuitry WC1 to communicate with the additional communicator circuitry WC2. The electronic controller circuitry EC1 is configured to control the wireless communicator WC11 to wirelessly communicate with the additional wireless communicator WC21. The wireless communicator WC11 is configured to be paired with another wireless communicator such as the additional wireless communicator WC21 using a pairing process. The additional wireless communicator WC21 is configured to be paired with another wireless communicator such as the wireless communicator WC11 using a pairing process.

The electronic controller circuitry EC1 includes a processor EC11. The electronic controller circuitry EC1 includes a memory EC12. The processor EC11 is coupled to the memory EC12. The memory EC12 is coupled to the processor EC11. The operating device ED1 includes a circuit board EC13 and a system bus EC14. The processor EC11 and the memory EC12 are electrically mounted on the circuit board EC13. The processor EC11 is electrically connected to the memory EC12 via the circuit board EC13 and the system bus EC14. The memory EC12 is electrically connected to the processor EC11 via the circuit board EC13 and the system bus EC14. For example, the electronic controller circuitry EC1 includes a semiconductor. The processor EC11 includes a semiconductor. The memory EC12 includes a semiconductor. However, the electronic controller circuitry EC1 can be free of a semiconductor if needed or desired. The processor EC11 can be free of a semiconductor if needed or desired. The memory EC12 can be free of a semiconductor if needed or desired.

For example, the processor EC11 includes at least one of a central processing unit (CPU), a micro processing unit (MPU), and a memory controller. The memory EC12 is electrically connected to the processor EC11. For example, the memory EC12 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC12 includes storage areas each having an address. The processor EC11 is configured to control the memory EC12 to store data in the storage areas of the memory EC12 and reads data from the storage areas of the memory EC12. The processor EC11 can also be referred to as a hardware processor EC11 or a processor circuit or circuitry EC11. The memory EC12 can also be referred to as a hardware memory EC12 or a memory circuit or circuitry EC12. The memory EC12 can also be referred to as a computer-readable storage medium EC12.

The electronic controller circuitry EC1 is configured to execute at least one control algorithm of the operating device ED1. For example, the electronic controller circuitry EC1 is programed to execute at least one control algorithm of the operating device ED1. The memory EC12 stores at least one program including at least one program instruction. The at least one program is read into the processor EC11, and thereby the at least one control algorithm of the operating device ED1 is executed based on the at least one program. The electronic controller circuitry EC1 can also be referred to as an electronic controller EC1. The electronic controller circuitry EC1 can also be referred to as an electronic hardware controller circuit or circuitry EC1.

The structure of the electronic controller circuitry EC1 is not limited to the above structure. The structure of the electronic controller circuitry EC1 is not limited to the above structure. The structure of the electronic controller circuitry EC1 is not limited to the processor EC11 and the memory EC12. The electronic controller circuitry EC1 can be realized by hardware alone or a combination of hardware and software. In the present embodiment, the processor EC11 and the memory EC12 are integrated as a single chip such as an application specific integrated circuit (ASIC) or a field programmable gate array (FPGA). However, the processor EC11 and the memory EC12 can be separate chips if needed or desired. The electronic controller circuitry EC1 can include the processor EC11, the memory EC12, the circuit board EC13, and the system bus EC14 if needed or desired. The electronic controller circuitry EC1 can be at least two electronic controllers which are separately provided.

The electronic controller circuitry EC1 can include at least two electronic controllers which are separately provided. The at least one control algorithm of the operating device ED1 can be executed by the at least two electronic controllers if needed or desired. The electronic controller circuitry EC1 can include at least two hardware processors which are separately provided. The electronic controller circuitry EC1 can include at least two hardware memories which are separately provided. The at least one control algorithm of the operating device ED1 can be executed by the at least two hardware processors if needed or desired. The at least one control algorithm of the operating device ED1 can be stored in the at least two hardware memories if needed or desired. The electronic controller circuitry EC1 can include at least two circuit boards which are separately provided if needed or desired. The electronic controller circuitry EC1 can include at least two system buses which are separately provided if needed or desired.

As seen in FIG. 4, the communicator circuitry WC1 is electrically mounted on the circuit board EC13. The communicator circuitry WC1 is electrically mounted on the circuit board EC13. However, the communicator circuitry WC1 can be electrically mounted on another circuit board in a case where the electronic controller circuitry EC1 includes at least two circuit boards. The communicator circuitry WC1 can be electrically mounted on another circuit board in a case where the electronic controller circuitry EC1 includes at least two circuit boards. The communicator circuitry WC1 can be electrically mounted on an electric component other than a circuit board.

The communicator circuitry WC1 is electrically connected to the processor EC11 and the memory EC12 with the circuit board EC13 and the system bus EC14. The communicator circuitry WC1 includes a signal transmitting circuit or circuitry, a signal receiving circuit or circuitry, and an antenna. Thus, the communicator circuitry WC1 can also be referred to as a communicator circuitry circuit or circuitry WC1.

The wireless communicator WC11 is configured to superimpose digital signals on carrier wave using a predetermined wireless communication protocol to wirelessly transmit signals. In the present embodiment, the wireless communicator WC11 is configured to encrypt signals using a cryptographic key to generate encrypted wireless signals. The wireless communicator WC11 is configured to transmit wireless signals via the antenna.

The wireless communicator WC11 is configured to receive wireless signals via the antenna. In the present embodiment, the wireless communicator WC11 is configured to decode the wireless signals to recognize signals transmitted from other wireless communicators. The wireless communicator WC11 is configured to decrypt the wireless signals using the cryptographic key.

At least one of the processor EC11, the memory EC12, and the communicator circuitry WC1 can be integrally provided with another of the processor EC11, the memory EC12, and the communicator circuitry WC1 as a single chip if needed or desired. At least one of the processor EC11, the memory EC12, and the communicator circuitry WC1 can be a separate chip from another of the processor EC11, the memory EC12, and the communicator circuitry WC1 if needed or desired.

The electronic controller circuitry EC1 is configured to periodically obtain a remaining level LV1 of the electric power source ED15 of the operating device ED1. The electronic controller circuitry EC1 is configured to store the remaining level LV1 of the electric power source ED15 in the memory EC12. Examples of the remaining level LV1 of the electric power source ED15 include a state-of-charge (SOC) and a state-of-health (SOH).

The electric device RD includes a battery sensor ED19. The battery sensor ED19 is configured to sense the remaining level LV1 of the electric power source ED15. The battery sensor ED19 is electrically connected to the power source holder RD6 and the electronic controller circuitry EC1. The battery sensor ED19 is configured to periodically sense the remaining level LV1 of the electric power source ED15.

The electronic controller circuitry EC1 is configured to compare the remaining level LV1 of the electric power source ED15 with a remaining-level threshold LVT1. The electronic controller circuitry EC1 is configured to store the remaining-level threshold LVT1 in the memory EC12.

As seen in FIG. 4, the electric device RD of the human-powered vehicle 10 comprises additional electronic controller circuitry EC2. The additional electronic controller circuitry EC2 is electrically connected to the electric actuator RD3 to control the electric actuator RD3 based on the control signal CS1. The additional electronic controller circuitry EC2 is electrically connected to the electric actuator RD3 to control the electric actuator RD3 based on the control signal CS1A or CS1B. The additional electronic controller circuitry EC2 is configured to control the electric actuator RD3 to generate the actuation force based on the control signal CS1. The additional electronic controller circuitry EC2 is configured to control the electric actuator RD3 to generate the actuation force based on the control signal CS1A or CS1B.

For example, the additional electronic controller circuitry EC2 is configured to control the electric actuator RD3 to move the movable member RD2 in an upshifting direction in response to the control signal CS1A. The additional electronic controller circuitry EC2 is configured to control the electric actuator RD3 to move the movable member RD2 in a downshifting direction in response to the control signal CS1B.

The additional electronic controller circuitry EC2 is electrically connected to the additional communicator circuitry WC2 to control the additional communicator circuitry WC2. The additional electronic controller circuitry EC2 is configured to control the additional communicator circuitry WC2 to wirelessly communicate with the communicator circuitry WC1.

The power source holder RD6 is electrically connected to the additional electronic controller circuitry EC2, the additional communicator circuitry WC2, and the electric actuator RD3. The electric power source RD5 is configured to supply electricity to the additional electronic controller circuitry EC2, the additional communicator circuitry WC2, and the electric actuator RD3 via the power source holder RD6.

As seen in FIG. 4, the additional electronic controller circuitry EC2 includes a processor EC21. The additional electronic controller circuitry EC2 includes a memory EC22. The processor EC21 is coupled to the memory EC22. The memory EC22 is coupled to the processor EC21. The electric device RD includes a circuit board EC23 and a system bus EC24. The processor EC21 and the memory EC22 are electrically mounted on the circuit board EC23. The processor EC21 is electrically connected to the memory EC22 via the circuit board EC23 and the system bus EC24. The memory EC22 is electrically connected to the processor EC21 via the circuit board EC23 and the system bus EC24. For example, the additional electronic controller circuitry EC2 includes a semiconductor. The processor EC21 includes a semiconductor. The memory EC22 includes a semiconductor. However, the additional electronic controller circuitry EC2 can be free of a semiconductor if needed or desired. The processor EC21 can be free of a semiconductor if needed or desired. The memory EC22 can be free of a semiconductor if needed or desired.

For example, the processor EC21 includes at least one of a central processing unit (CPU), a micro processing unit (MPU), and a memory controller. The memory EC22 is electrically connected to the processor EC21. For example, the memory EC22 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC22 includes storage areas each having an address. The processor EC21 is configured to control the memory EC22 to store data in the storage areas of the memory EC22 and reads data from the storage areas of the memory EC22. The memory EC22 can also be referred to as a hardware memory EC22. The memory EC22 can also be referred to as a computer-readable storage medium EC22.

The additional electronic controller circuitry EC2 is configured to execute at least one control algorithm of the electric device RD. For example, the additional electronic controller circuitry EC2 is programed to execute at least one control algorithm of the electric device RD. The memory EC22 stores at least one program including at least one program instruction. The at least one program is read into the processor EC21, and thereby the at least one control algorithm of the electric device RD is executed based on the at least one program. The additional electronic controller circuitry EC2 can also be referred to as an additional electronic controller EC2. The additional electronic controller circuitry EC2 can also be referred to as an additional electronic hardware controller circuit or circuitry EC2.

The structure of the additional electronic controller circuitry EC2 is not limited to the above structure. The structure of the additional electronic controller circuitry EC2 is not limited to the above structure. The structure of the additional electronic controller circuitry EC2 is not limited to the processor EC21 and the memory EC22. The additional electronic controller circuitry EC2 can be realized by hardware alone or a combination of hardware and software. In the present embodiment, the processor EC21 and the memory EC22 are integrated as a single chip such as an application specific integrated circuit (ASIC) or a field programmable gate array (FPGA). However, the processor EC21 and the memory EC22 can be separate chips if needed or desired. The additional electronic controller circuitry EC2 can include the processor EC21, the memory EC22, the circuit board EC23, and the system bus EC24 if needed or desired. The additional electronic controller circuitry EC2 can be at least two electronic controllers which are separately provided.

The additional electronic controller circuitry EC2 can include at least two electronic controllers which are separately provided. The at least one control algorithm of the electric device RD can be executed by the at least two electronic controllers if needed or desired. The additional electronic controller circuitry EC2 can include at least two hardware processors which are separately provided. The additional electronic controller circuitry EC2 can include at least two hardware memories which are separately provided. The at least one control algorithm of the electric device RD can be executed by the at least two hardware processors if needed or desired. The at least one control algorithm of the electric device RD can be stored in the at least two hardware memories if needed or desired. The additional electronic controller circuitry EC2 can include at least two circuit boards which are separately provided if needed or desired. The additional electronic controller circuitry EC2 can include at least two system buses which are separately provided if needed or desired.

As seen in FIG. 4, the additional communicator circuitry WC2 is electrically mounted on the circuit board EC23. The additional communicator circuitry WC2 is electrically mounted on the circuit board EC23. However, the additional communicator circuitry WC2 can be electrically mounted on another circuit board in a case where the additional electronic controller circuitry EC2 includes at least two circuit boards. The additional communicator circuitry WC2 can be electrically mounted on another circuit board in a case where the additional electronic controller circuitry EC2 includes at least two circuit boards. The additional communicator circuitry WC2 can be electrically mounted on an electric component other than a circuit board.

The additional communicator circuitry WC2 is electrically connected to the processor EC21 and the memory EC22 with the circuit board EC23 and the system bus EC24. The additional communicator circuitry WC2 includes a signal transmitting circuit or circuitry, a signal receiving circuit or circuitry, and an antenna. Thus, the additional communicator circuitry WC2 can also be referred to as a wireless communicator circuit or circuitry WC2.

The additional wireless communicator WC21 is configured to superimpose digital signals on carrier wave using a predetermined wireless communication protocol to wirelessly transmit signals. In the present embodiment, the additional wireless communicator WC21 is configured to encrypt signals using a cryptographic key to generate encrypted wireless signals. The additional wireless communicator WC21 is configured to transmit wireless signals via the antenna.

The additional wireless communicator WC21 is configured to receive wireless signals via the antenna. In the present embodiment, the additional wireless communicator WC21 is configured to decode the wireless signals to recognize signals transmitted from other wireless communicators. The additional wireless communicator WC21 is configured to decrypt the wireless signals using the cryptographic key.

The electric device RD includes an actuator driver RD7. The actuator driver RD7 is electrically connected to the electric actuator RD3 to control the electric actuator RD3 based on a command generated by the additional electronic controller circuitry EC2. The actuator driver RD7 is electrically connected to the additional electronic controller circuitry EC2 to receive the command from the additional electronic controller circuitry EC2. The actuator driver RD7 is configured to supply electricity from the electric power source RD5 to the electric actuator RD3 based on the command. The actuator driver RD7 is configured to control the actuation direction of the electric actuator RD3 based on the command.

For example, the actuator driver RD7 is configured to control the electric actuator RD3 to move the movable member RD2 in the upshifting direction in response to an upshift command transmitted from the additional electronic controller circuitry EC2. The actuator driver RD7 is configured to control the electric actuator RD3 to move the movable member RD2 in the downshifting direction in response to a downshift command transmitted from the additional electronic controller circuitry EC2.

The additional electronic controller circuitry EC2 is configured to control the additional wireless communicator WC21 of the additional communicator circuitry WC2 to wirelessly transmit a signal SG to the operating device ED1 in response to the control signal CS1. The additional electronic controller circuitry EC2 is configured to control the additional wireless communicator WC21 of the additional communicator circuitry WC2 to wirelessly transmit the signal SG to the operating device ED1 in response to the control signal CS1A or CS1B. The signal SG includes an acknowledge signal. The electronic controller circuitry EC1 is configured to receive the signal SG via the wireless communicator WC11 of the communicator circuitry WC1. The electronic controller circuitry EC1 recognizes that the wireless connection is still maintained between the wireless communicator WC11 and the additional wireless communicator WC21 based on the signal SG.

At least one of the processor EC21, the memory EC22, the additional wireless communicator circuitry WC2, and the actuator driver RD7 can be integrally provided with another of the processor EC21, the memory EC22, the additional wireless communicator circuitry WC2, and the actuator driver RD7 as a single chip if needed or desired. At least one of the processor EC21, the memory EC22, the additional wireless communicator circuitry WC2, and the actuator driver RD7 can be a separate chip from another of the processor EC21, the memory EC22, the additional wireless communicator circuitry WC2, and the actuator driver RD7 if needed or desired.

The additional electronic controller circuitry EC2 is configured to periodically obtain a remaining level LV2 of the electric power source RD5. The additional electronic controller circuitry EC2 is configured to store the remaining level LV2 of the electric power source RD5 in the memory EC22. Examples of the remaining level LV2 of the electric power source RD5 include a SOC and a SOH.

The electric device RD includes a battery sensor RD9. The battery sensor RD9 is configured to sense the remaining level LV2 of the electric power source RD5. The battery sensor RD9 is electrically connected to the power source holder RD6 and the additional electronic controller circuitry EC2. The battery sensor RD9 is configured to periodically sense the remaining level LV2 of the electric power source RD5.

The additional electronic controller circuitry EC2 is configured to compare the remaining level LV2 of the electric power source RD5 with a remaining-level threshold LVT2. The additional electronic controller circuitry EC2 is configured to store the remaining-level threshold LVT2 in the memory EC22.

As seen in FIG. 4, the operating device ED1 of the human-powered vehicle 10 comprises an output unit ED17. The output unit ED17 is configured to output information relating to the human-powered vehicle 10. The electronic controller circuitry EC1 is electrically connected to the output unit ED17 to control the output unit ED17. The output unit ED17 is electrically connected to the electric power source ED15 via the power source holder ED16.

The electronic controller circuitry EC1 is electrically connected to the output unit ED17 to control the output unit ED17 based on the user input operation U1 and the remaining level LV2 of the electric power source RD5 of the electric device RD. The output unit ED17 is configured to output, in response to the user input operation U1, information indicating the remaining level LV2 of the electric power source ED15.

The output unit ED17 is configured to output, in response to the user input operation U1, first information INF21 indicating that the remaining level LV2 of the electric power source RD5 is lower than a remaining-level threshold LVT2 in a case where the remaining level LV2 is lower than the remaining-level threshold LVT2.

In the present embodiment, the output unit ED17 is configured to output the first information INF21 in response to at least one of the user input operations U1A and U1B in the case where the remaining level LV2 is lower than the remaining-level threshold LVT2. The output unit ED17 is configured to output the first information INF21 in response to press of at least one of the operating members ED13A and ED13B in the case where the remaining level LV2 is lower than the remaining-level threshold LVT2.

The output unit ED17 is configured to output the first information INF21 in response to the user input operation U1A in the case where the remaining level LV2 is lower than the remaining-level threshold LVT2. The output unit ED17 is configured to output the first information INF21 in response to the press of the operating member ED13A in the case where the remaining level LV2 is lower than the remaining-level threshold LVT2.

The output unit ED17 is configured to output the first information INF21 in response to the user input operation U1B in the case where the remaining level LV2 is lower than the remaining-level threshold LVT2. The output unit ED17 is configured to output the first information INF21 in response to the press of the operating member ED13B in the case where the remaining level LV2 is lower than the remaining-level threshold LVT2.

However, the user input operation U1 is not limited to one of the user input operations U1A and U1B, the press of one of the operating members ED13A and ED13B, or the press of one of the electric switches SW1A and SW1B. The output unit ED17 can be configured to output the first information INF21 in response to another user input operation such as the concurrent receipts of the user input operations U1A and U1B, the concurrent presses of the operating members ED13A and ED13B, and the concurrent presses of the electric switches SW1A and SW1B.

In the present embodiment, the output unit ED17 includes an indicator ED18. The indicator ED18 is configured to indicate the first information INF21 in response to the user input operation U1 in the case where the remaining level LV2 is lower than the remaining-level threshold LVT2.

In the present embodiment, the indicator ED18 is configured to indicate the first information INF21 in response to the concurrent receipts of the user input operations U1A and U1B in the case where the remaining level LV2 is lower than the remaining-level threshold LVT2. The indicator ED18 is configured to indicate the first information INF21 in response to the concurrent presses of the operating members ED13A and ED13B in the case where the remaining level LV2 is lower than the remaining-level threshold LVT2. However, the user input operation U1 is not limited to the concurrent receipts of the user input operations U1A and U1B or the concurrent presses of the operating members ED13A and ED13B. The indicator ED18 can be configured to indicate the first information INF21 in response to another user input operation such as a long press of the operating member ED13A or ED13B or a long press of the electric switch SW1A or SW1B.

For example, the indicator ED18 includes a light emitter configured to emit light. Examples of the light emitter include a light emitting diode (LED). The indicator ED18 is configured to emit light to indicate the first information INF21 in response to the user input operation U1 in the case where the remaining level LV2 is lower than the remaining-level threshold LVT2.

In the present embodiment, the indicator ED18 is configured to emit light to indicate the first information INF21 in response to the concurrent receipts of the user input operations U1A and U1B in the case where the remaining level LV2 is lower than the remaining-level threshold LVT2. The indicator ED18 is configured to emit light to indicate the first information INF21 in response to the concurrent presses of the operating members ED13A and ED13B in the case where the remaining level LV2 is lower than the remaining-level threshold LVT2. However, the user input operation U1 is not limited to the concurrent receipts of the user input operations U1A and U1B or the concurrent presses of the operating members ED13A and ED13B. The indicator ED18 can be configured to emit light to indicate the first information INF21 in response to another user input operation such as a long press of the operating member ED13A or ED13B or a long press of the electric switch SW1A or SW1B.

In the present embodiment, the output unit ED17 includes the indicator ED18 configured to emit light to indicate the first information INF21. However, the output unit ED17 can include structures other the indicator ED18 instead of or in addition to the light emitter if needed or desired. Examples of the other structure include a loudspeaker and a vibrator.

The wireless communicator WC11 is configured to wirelessly receive remaining-level information INFL2 relating to the remaining level LV2 of the electric power source RD5 of the electric device RD. The wireless communicator WC11 is configured to wirelessly receive the remaining-level information INFL2 relating to the remaining level LV2 of the electric power source RD5 of the gear changer. The wireless communicator WC11 is configured to wirelessly receive the remaining-level information INFL2 relating to the remaining level LV2 of the electric power source RD5 of the rear derailleur.

The wireless communicator WC11 is configured to wirelessly receive the signal SG including the remaining-level information INFL2 from the electric device RD. The wireless communicator WC11 is configured to wirelessly receive the signal SG which is wirelessly transmitted from the electric device RD in response to the control signal CS1.

The additional electronic controller circuitry EC2 is configured to control the additional wireless communicator WC21 to generate the signal SG including the remaining-level information INFL2 in response to the control signal CS1 in the case where the remaining level LV2 is lower than the remaining-level threshold LVT2. The additional electronic controller circuitry EC2 is configured to control the additional wireless communicator WC21 to generate the signal SG including the remaining-level information INFL2 in response to the control signal CS1A or CS1B in the case where the remaining level LV2 is lower than the remaining-level threshold LVT2.

In the case where the remaining level LV2 is lower than the remaining-level threshold LVT2, the remaining-level information INFL2 includes the first information INF21 indicating that the remaining level LV2 is lower than the remaining-level threshold LVT2. Thus, the additional electronic controller circuitry EC2 is configured to control the additional wireless communicator WC21 to generate the signal SG including the first information INF21 in the case where the remaining level LV2 is lower than the remaining-level threshold LVT2. The additional electronic controller circuitry EC2 is configured to control the additional wireless communicator WC21 to wirelessly transmit the signal SG in response to the control signal CS1. The additional electronic controller circuitry EC2 is configured to control the additional wireless communicator WC21 to wirelessly transmit the signal SG in response to the control signal CS1A or CS1B.

In the present embodiment, the first information INF21 indicates that the remaining level LV2 is lower than or equal to the remaining-level threshold LVT2. The additional electronic controller circuitry EC2 is configured to control the additional wireless communicator WC21 to generate the signal SG including the first information INF21 in the case where the remaining level LV2 is lower than or equal to the remaining-level threshold LVT2. However, the first information INF21 can indicate only that the remaining level LV2 is lower than the remaining-level threshold LVT2 if needed or desired. The additional electronic controller circuitry EC2 can be configured to execute another process in a case where the remaining level LV2 is equal to the remaining-level threshold LVT2 if needed or desired.

The electronic controller circuitry EC1 is configured to control the wireless communicator WC11 to wirelessly receive the signal SG. The electronic controller circuitry EC1 is configured to recognize the remaining-level information INFL2 included in the signal SG. The electronic controller circuitry EC1 is configured to control the wireless communicator WC11 to wirelessly receive the signal SG. The electronic controller circuitry EC1 is configured to recognize the first information INF21 included in the signal SG. The electronic controller circuitry EC1 is configured to recognize the first information INF21 indicating that the remaining level LV2 of the electric power source RD5 is lower than or equal to the remaining-level threshold LVT2.

The electronic controller circuitry EC1 is configured to control the output unit ED17 to output the first information INF21 in response to receipt of the signal SG. The electronic controller circuitry EC1 is configured to control the indicator ED18 to indicate the first information INF21 in response to receipt of the signal SG. The electronic controller circuitry EC1 is configured to control the indicator ED18 to emit light in a case where the electronic controller circuitry EC1 recognizes the first information INF21 included in the signal SG.

In the present embodiment, the electronic controller circuitry EC1 is configured to control the indicator ED18 to emit light in a first manner in the case where the electronic controller circuitry EC1 recognizes the first information INF21 included in the signal SG. For example, the electronic controller circuitry EC1 is configured to control the indicator ED18 to emit light with a first color for a first period in the case where the electronic controller circuitry EC1 recognizes the first information INF21 included in the signal SG. Thus, it is possible to let the user know that the remaining level LV2 of the electric power source RD5 of the electric device RD is lower than the remaining-level threshold LVT2.

Figure 5:
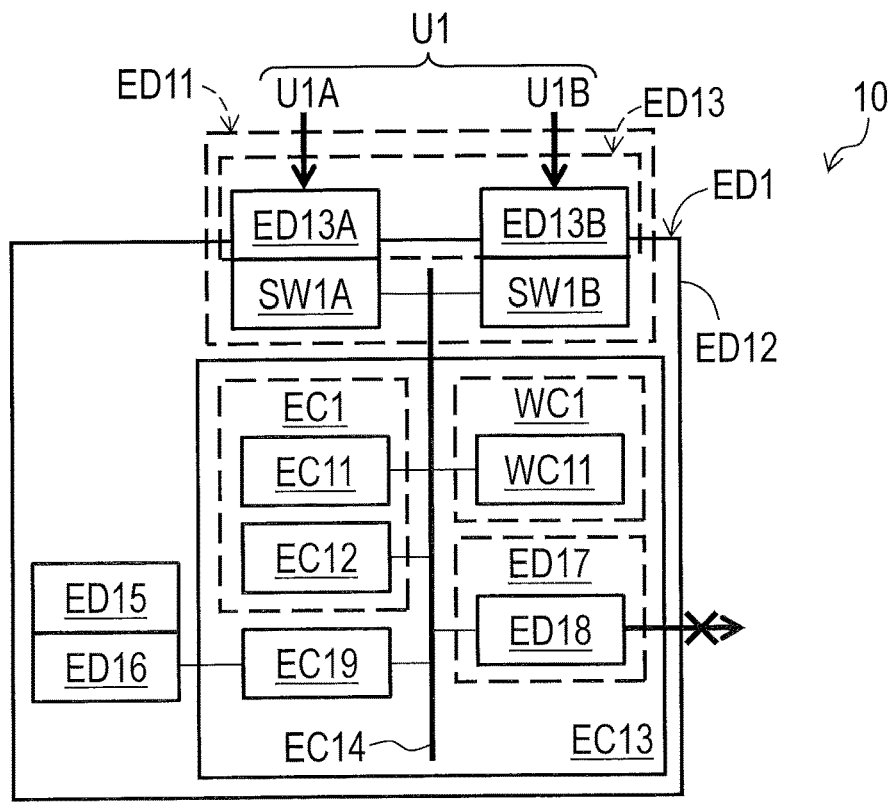
FIG. 5 is a schematic block diagram of the operating device and the electric device of the control system illustrated in FIG. 2 (in a case where the remaining level of the electric power source of the electric device is higher than the remaining-level threshold).
Figure 5:
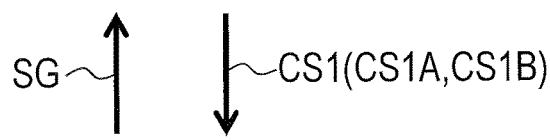
Figure 5:
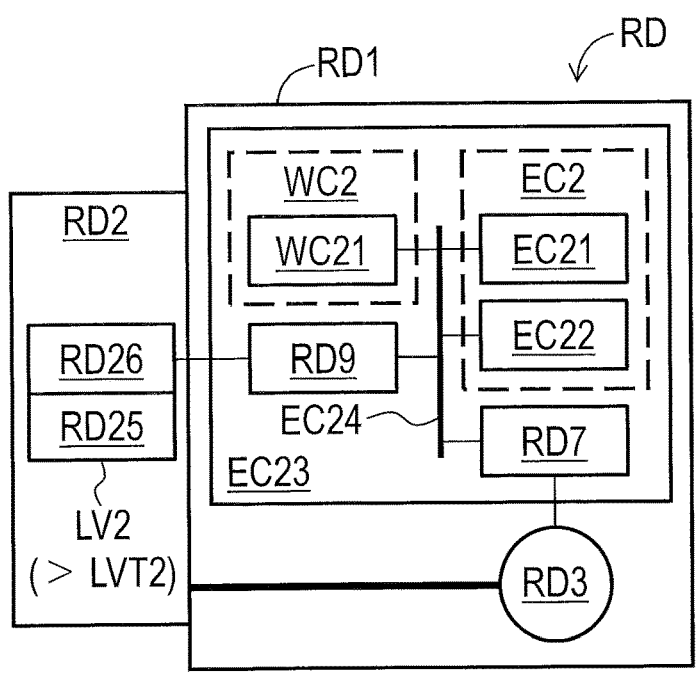

As seen in FIG. 5, the output unit ED17 is configured to be free of outputting, in response to the user input operation U1, information indicating the remaining level LV2 of the electric power source RD5 in the case where the remaining level LV2 is higher than the remaining-level threshold LVT2. The output unit ED17 is configured to be free of outputting, in response to the user input operation U1, second information INF22 indicating that the remaining level LV2 of the electric power source RD5 is higher than the remaining-level threshold LVT2 in a case where the remaining level LV2 is higher than the remaining-level threshold LVT2.

The indicator ED18 is configured to be free of indicating the second information INF22 in response to the user input operation U1 in the case where the remaining level LV2 is higher than the remaining-level threshold LVT2. The indicator ED18 is configured to be free of emitting light in response to the user input operation U1 in the case where the remaining level LV2 is higher than the remaining-level threshold LVT2.

The additional electronic controller circuitry EC2 is configured to control the additional wireless communicator WC21 to generate the signal SG which is free of the remaining-level information INFL2 in response to the control signal CS1 in the case where the remaining level LV2 is higher than the remaining-level threshold LVT2. The additional electronic controller circuitry EC2 is configured to control the additional wireless communicator WC21 to generate the signal SG which is free of the remaining-level information INFL2 in response to the control signal CS1A or CS1B in the case where the remaining level LV2 is higher than the remaining-level threshold LVT2.

As seen in FIG. 5, the electronic controller circuitry EC1 is configured to receive the signal SG which is free of the second information INF22 indicating that the remaining level LV2 of the electric power source RD5 is higher than the remaining-level threshold LVT2 after the user interface ED11 receives the user input operation U1. The electronic controller circuitry EC1 is configured to receive the signal SG which is free of the second information INF22 indicating that the remaining level LV2 of the electric power source RD5 is higher than the remaining-level threshold LVT2 after transmitting the control signal CS1. Thus, the electronic controller circuitry EC1 is configured to recognize that the signal SG is free of the remaining-level information INFL2. The electronic controller circuitry EC1 is configured to recognize that the signal SG is free of the second information INF22.

The electronic controller circuitry EC1 is configured to be free of controlling the output unit ED17 to output the remaining-level information INFL2 in a case where the signal SG is free of the remaining-level information INFL2. The electronic controller circuitry EC1 is configured to be free of controlling the output unit ED17 to output the second information INF22 in a case where the signal SG is free of the second information INF22. Thus, the electronic controller circuitry EC1 is configured to be free of controlling the output unit ED17 to output the second information INF22 in response to the user input operation U1. The electronic controller circuitry EC1 is configured to be free of controlling the indicator ED18 to indicate the second information INF22 in response to receipt of the signal SG. The electronic controller circuitry EC1 is configured to be free of controlling the indicator ED18 to emit light in a case where the electronic controller circuitry EC1 recognizes the second information INF22 included in the signal SG. Accordingly, it is possible to reduce power consumption of the electric power source ED15 of the operating device ED1 while letting the user know that the remaining level LV2 of the electric power source RD5 of the electric device RD is lower than the remaining-level threshold LVT2.

Figure 6:
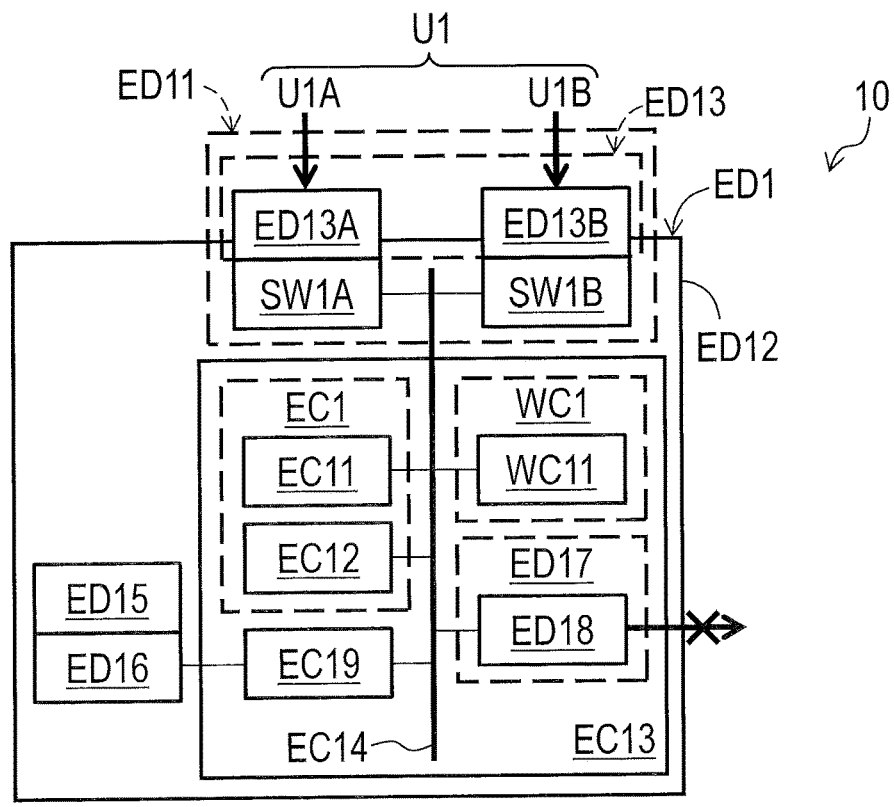
FIG. 6 is a schematic block diagram of the operating device and the electric device of the control system illustrated in FIG. 2 in accordance with a first modification (in a case where the remaining level of the electric power source of the electric device is higher than the remaining-level threshold).
Figure 6:
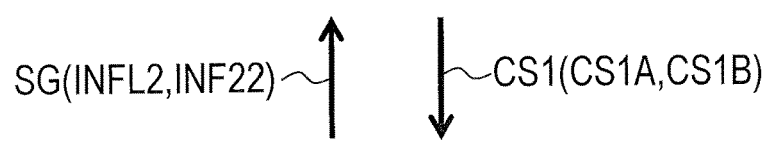
Figure 6:
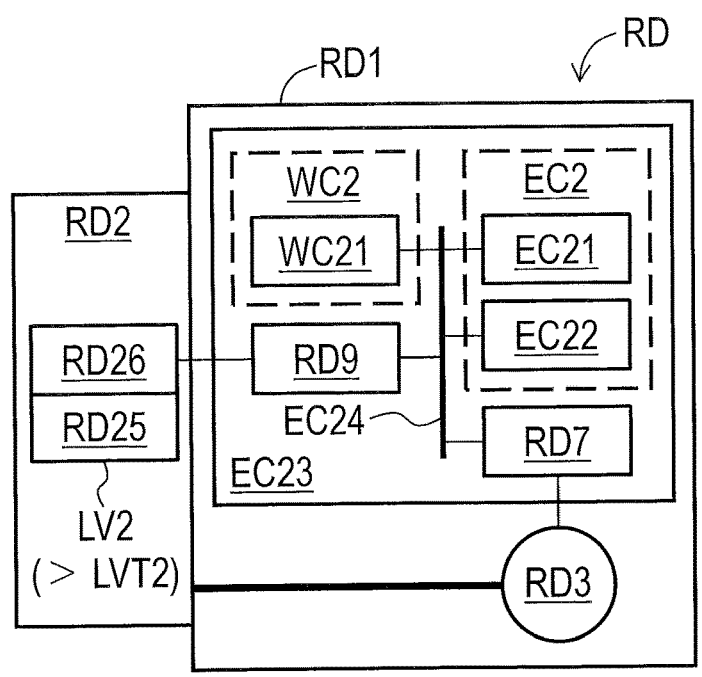

As seen in FIG. 5, in the present embodiment and the modifications thereof, the additional electronic controller circuitry EC2 is configured to control the additional wireless communicator WC21 to generate the signal SG which is free of the remaining-level information INFL2 in response to the control signal CS1 in the case where the remaining level LV2 is higher than the remaining-level threshold LVT2. As seen in FIG. 6, however, the additional electronic controller circuitry EC2 can be configured to control the additional wireless communicator WC21 to generate the signal SG including the remaining-level information INFL2 in response to the control signal CS1 in the case where the remaining level LV2 is higher than the remaining-level threshold LVT2 if needed or desired. The additional electronic controller circuitry EC2 can be configured to control the additional wireless communicator WC21 to generate the signal SG including the second information INF22 in response to the control signal CS1 in the case where the remaining level LV2 is higher than the remaining-level threshold LVT2 if needed or desired.

In the modification depicted in FIG. 6, the output unit ED17 is configured to be free of outputting, in response to the user input operation U1, the second information INF22 indicating that the remaining level LV2 of the electric power source RD5 is higher than the remaining-level threshold LVT2 in a case where the remaining level LV2 is higher than the remaining-level threshold LVT2. The indicator ED18 is configured to be free of indicating the second information INF22 in response to the user input operation U1 in the case where the remaining level LV2 is higher than the remaining-level threshold LVT2. The indicator ED18 is configured to be free of emitting light in response to the user input operation U1 in the case where the remaining level LV2 is higher than the remaining-level threshold LVT2.

Figure 7:
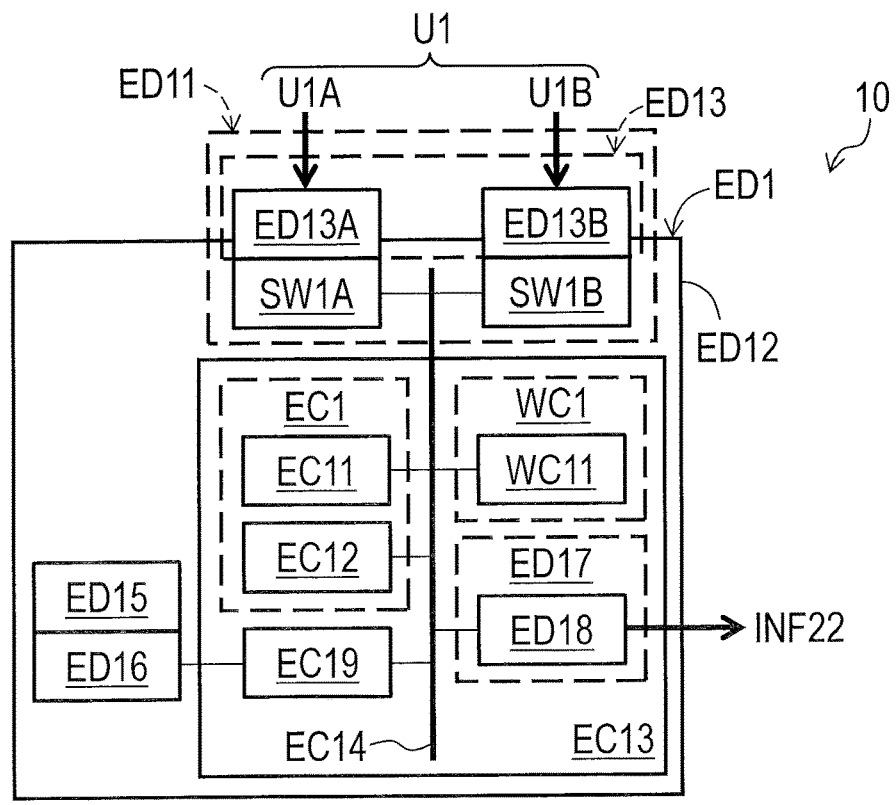
FIG. 7 is a schematic block diagram of the operating device and the electric device of the control system illustrated in FIG. 2 in accordance with a second modification (in a case where the remaining level of the electric power source of the electric device is higher than the remaining-level threshold).
Figure 7:
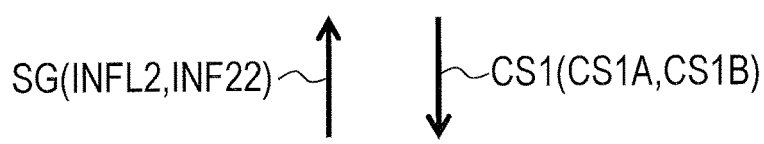
Figure 7:
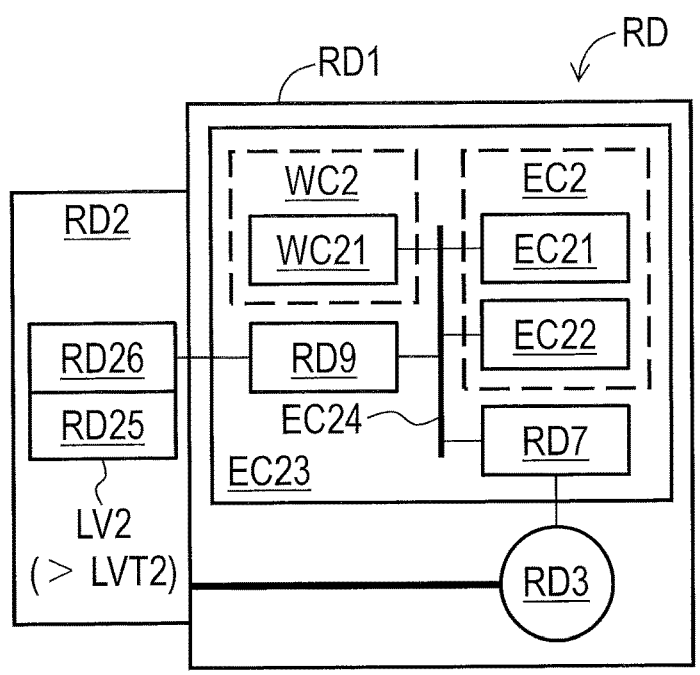

Furthermore, as seen in FIG. 7, the output unit ED17 can be configured to output, in response to the user input operation U1, the second information INF22 indicating that the remaining level LV2 of the electric power source RD5 is higher than the remaining-level threshold LVT2 in the case where the remaining level LV2 is higher than the remaining-level threshold LVT2 if needed or desired. The indicator ED18 can be configured to indicate the second information INF22 in response to the user input operation U1 in the case where the remaining level LV2 is higher than the remaining-level threshold LVT2 if needed or desired. The indicator ED18 can be configured to emit light in response to the user input operation U1 in the case where the remaining level LV2 is higher than the remaining-level threshold LVT2 if needed or desired.

Figure 8:
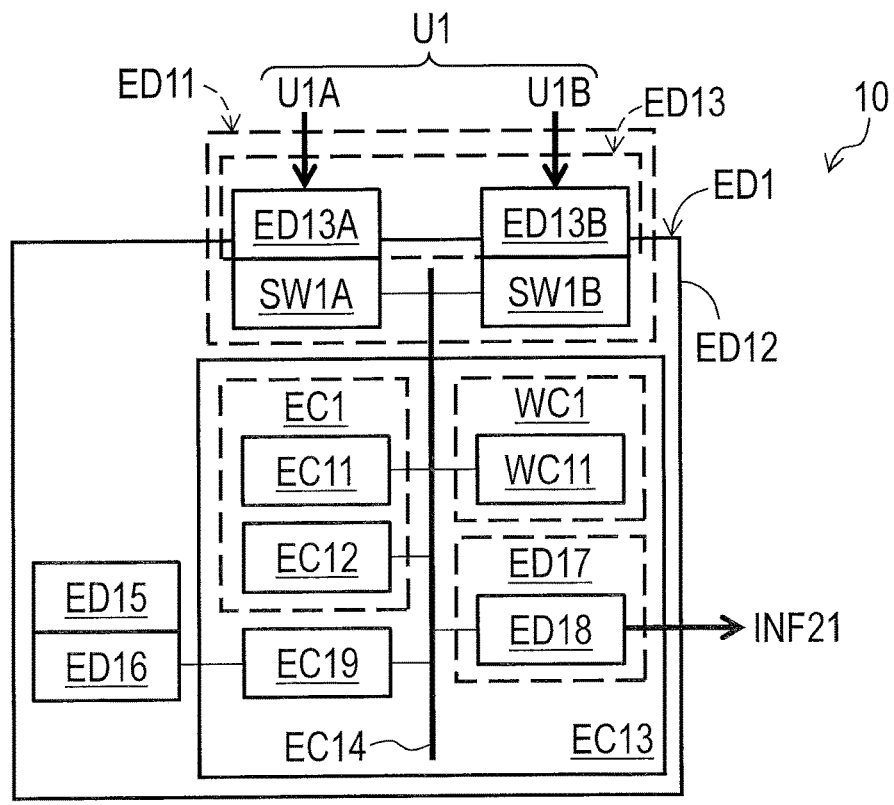
FIG. 8 is a schematic block diagram of the operating device and the electric device of the control system illustrated in FIG. 2 in accordance with a third modification (in a case where the remaining level of the electric power source of the electric device is lower than or equal to the remaining-level threshold).
Figure 8:
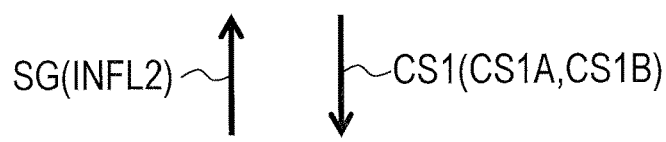
Figure 8:
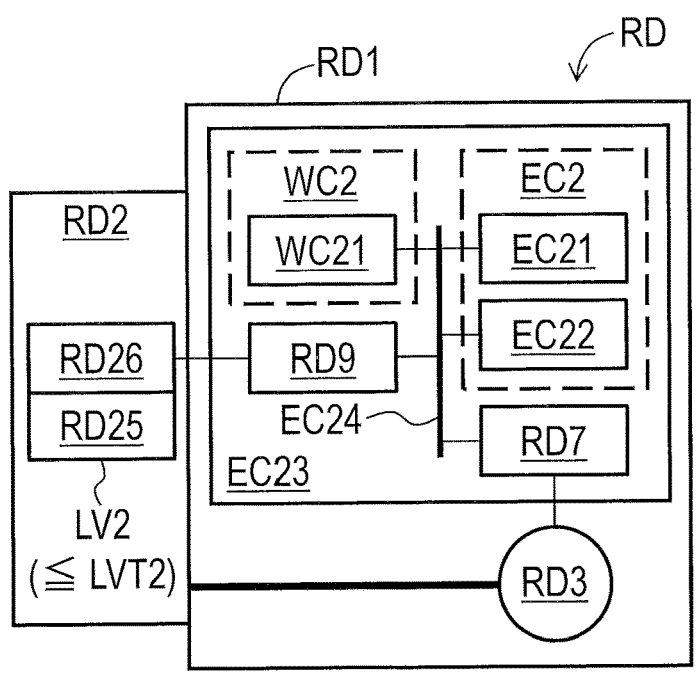
Figure 9:
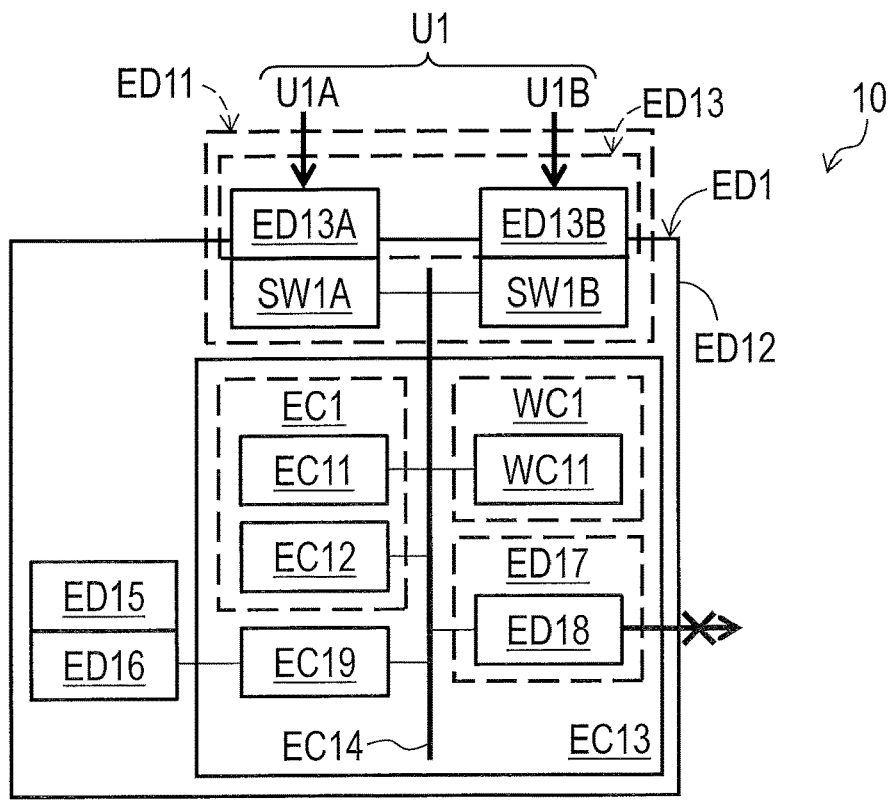
FIG. 9 is a schematic block diagram of the operating device and the electric device of the control system illustrated in FIG. 2 in accordance with the third modification (in a case where the remaining level of the electric power source of the electric device is higher than the remaining-level threshold).
Figure 9:
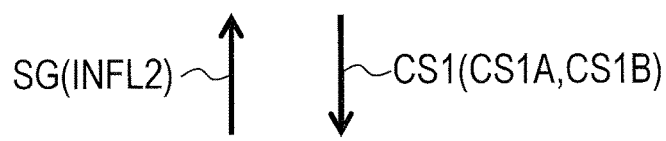
Figure 9:
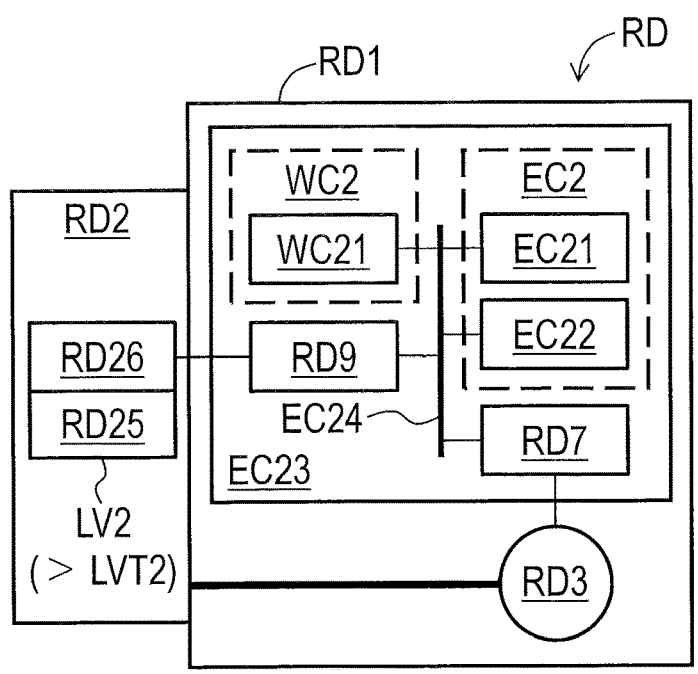

In the embodiment and the modifications depicted in FIGS. 1 to 7, the additional electronic controller circuitry EC2 determines whether the remaining level LV2 is higher than the remaining-level threshold LVT2. As seen in FIGS. 8 and 9, however, the electronic controller circuitry EC1 can be configured to determine whether the remaining level LV2 is higher than the remaining-level threshold LVT2. In the modification depicted in FIGS. 8 and 9, the additional electronic controller circuitry EC2 is configured to control the additional wireless communicator WC21 to generate the signal SG including the remaining-level information INFL2 and the remaining-level threshold LVT2 in response to the control signal CS1 regardless of the relationship between the remaining level LV2 and the remaining-level threshold LVT2. The electronic controller circuitry EC1 is configured to compare the remaining-level information INFL2 with the remaining-level threshold LVT2 after receiving the signal SG.

As seen in FIG. 8, the electronic controller circuitry EC1 is configured to control the output unit ED17 to output the first information INF21 indicating that the remaining level LV2 of the electric power source RD5 is lower than or equal to the remaining-level threshold LVT2 in the case where the electric power source RD5 is lower than or equal to the remaining-level threshold LVT2. Thus, the output unit ED17 is configured to output, in response to the user input operation U1, the first information INF21 indicating that the remaining level LV2 of the electric power source RD5 is lower than or equal to the remaining-level threshold LVT2 in the case where the remaining level LV2 is lower than the remaining-level threshold LVT2.

As seen in FIG. 9, the electronic controller circuitry EC1 is configured to control the output unit ED17 to be free of outputting the second information INF22 indicating that the remaining level LV2 of the electric power source RD5 is higher than the remaining-level threshold LVT2 in the case where the electric power source RD5 is higher than the remaining-level threshold LVT2. Thus, the output unit ED17 is configured to output, in response to the user input operation U1, the second information INF22 indicating that the remaining level LV2 of the electric power source RD5 is lower than or equal to the remaining-level threshold LVT2 in the case where the remaining level LV2 is lower than the remaining-level threshold LVT2.

Figure 10:
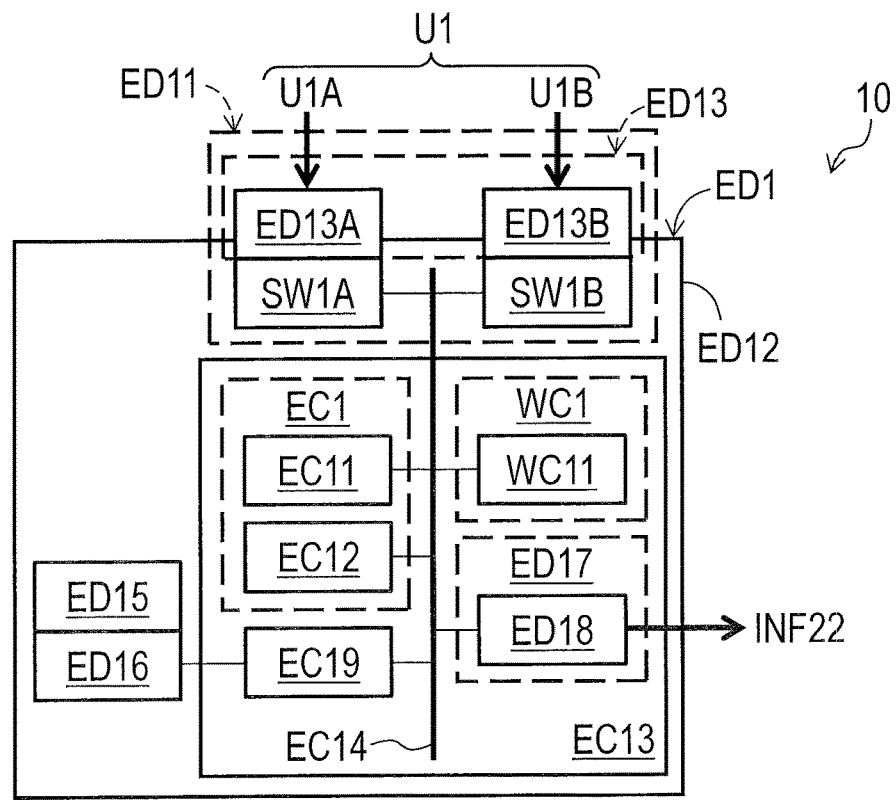
FIG. 10 is a schematic block diagram of the operating device and the electric device of the control system illustrated in FIG. 2 in accordance with a fourth modification (in a case where the remaining level of the electric power source of the electric device is higher than the remaining-level threshold).
Figure 10:
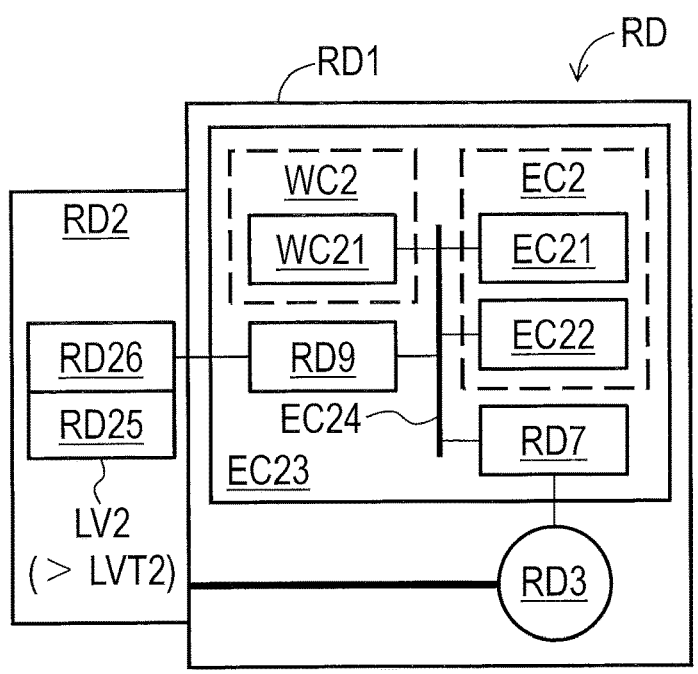

In the modification depicted in FIGS. 8 and 9, as seen in FIG. 10, the output unit ED17 can be configured to output, in response to the user input operation U1, the second information INF22 indicating that the remaining level LV2 of the electric power source RD5 is higher than the remaining-level threshold LVT2 in the case where the remaining level LV2 is higher than the remaining-level threshold LVT2 if needed or desired. The indicator ED18 can be configured to indicate the second information INF22 in response to the user input operation U1 in the case where the remaining level LV2 is higher than the remaining-level threshold LVT2 if needed or desired. The indicator ED18 can be configured to emit light in response to the user input operation U1 in the case where the remaining level LV2 is higher than the remaining-level threshold LVT2 if needed or desired.

Figure 11:
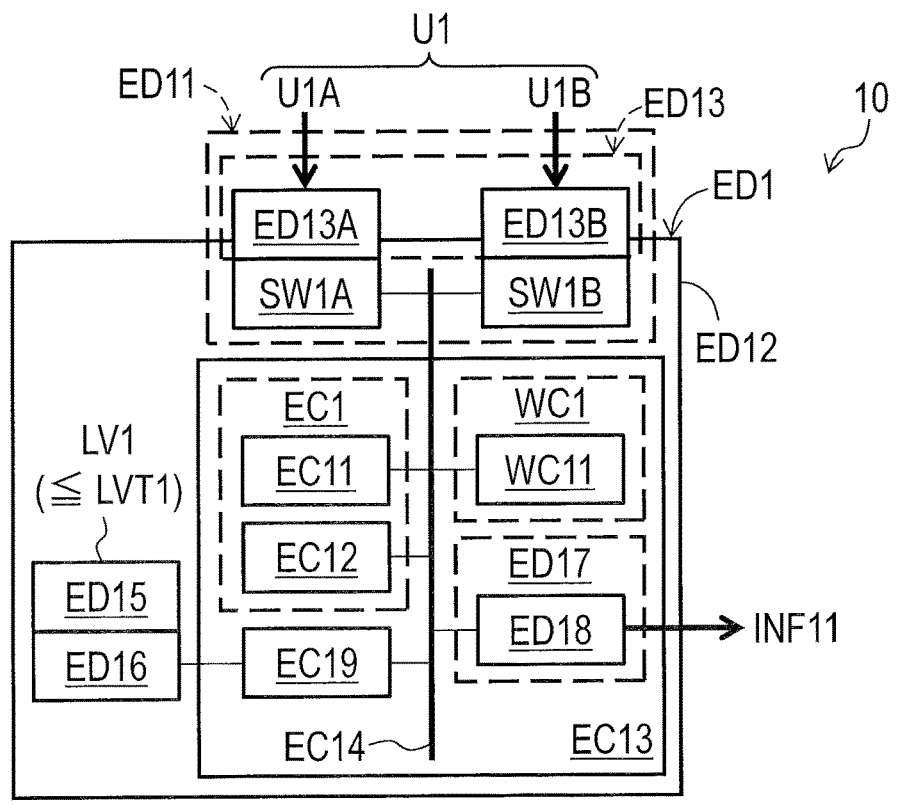
FIG. 11 is a schematic block diagram of the operating device and the electric device of the control system illustrated in FIG. 2 in accordance with a fifth modification (in a case where a remaining level of an electric power source of the operating device is lower than or equal to a remaining-level threshold).
Figure 11:
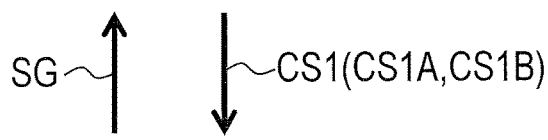
Figure 11:
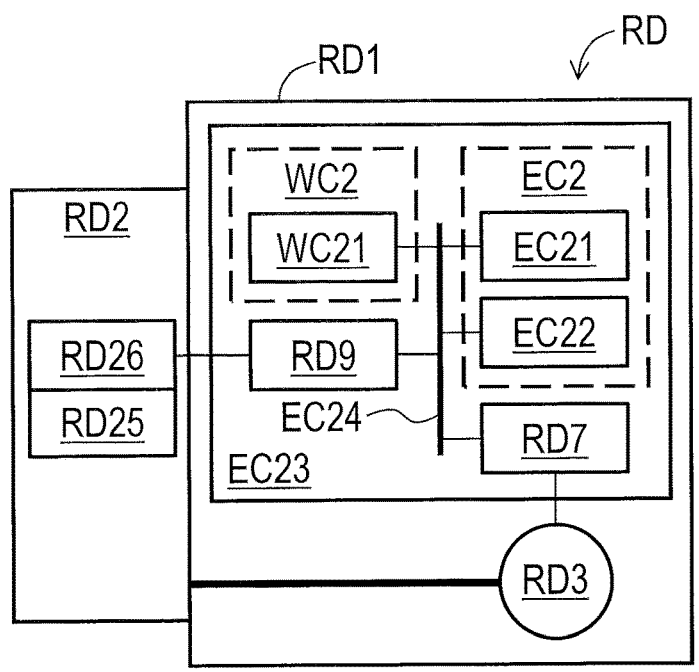
Figure 12:
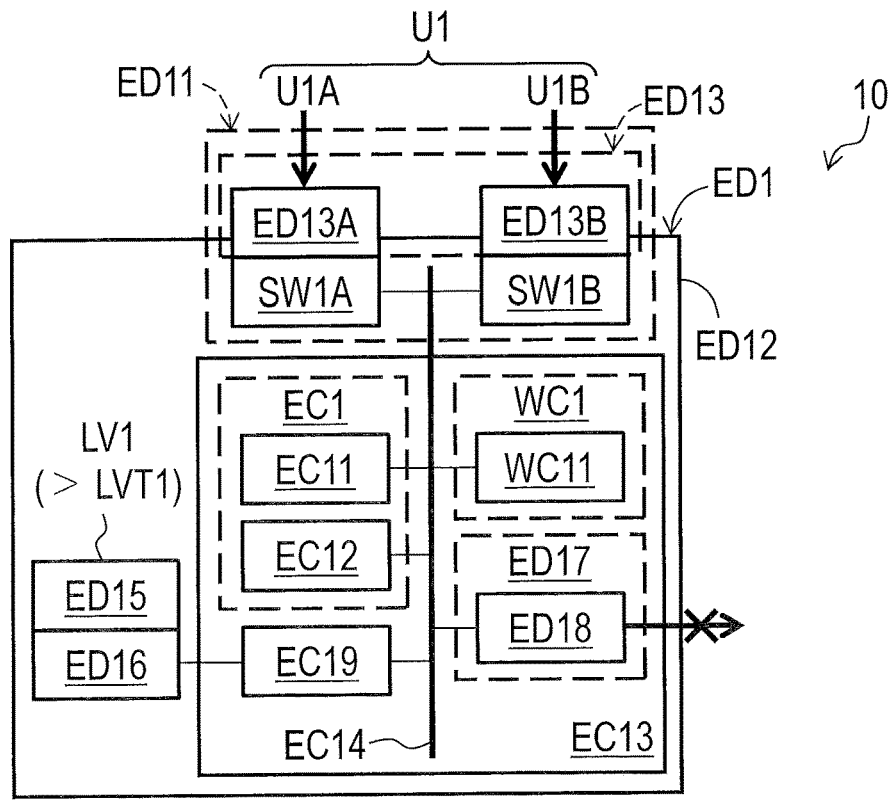
FIG. 12 is a schematic block diagram of the operating device and the electric device of the control system illustrated in FIG. 2 in accordance with the fifth modification (in a case where the remaining level of the electric power source of the operating device is higher than the remaining-level threshold).
Figure 12:
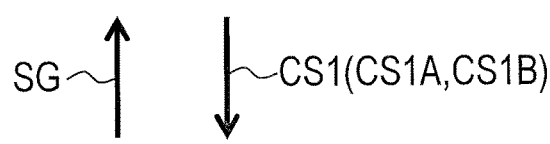
Figure 12:
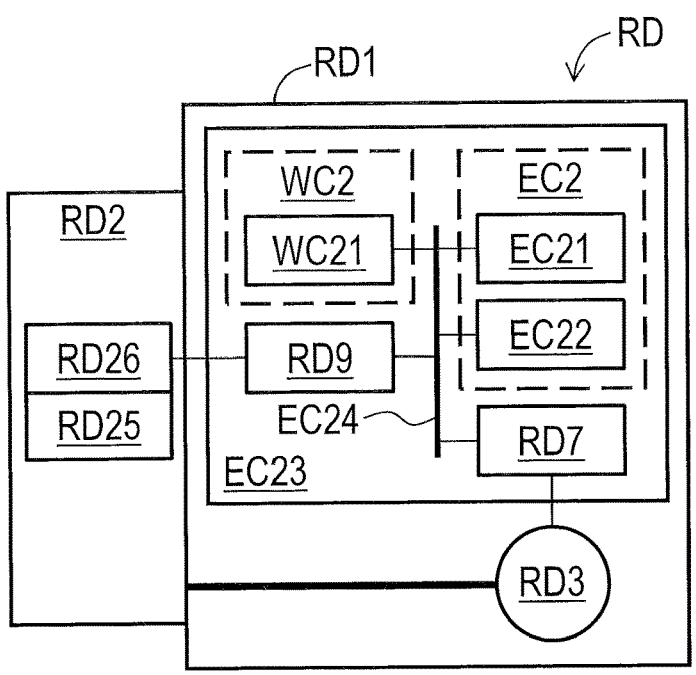

In the embodiment and the modifications depicted in FIGS. 1 to 10, the output unit ED17 is configured to output the remaining-level information INFL2 of the electric power source RD5 in response to the user input operation U1. As seen in FIG. 11, however, the output unit ED17 can be configured to output, in response to the user input operation U1, first information INF11 indicating that the remaining level LV1 of the electric power source ED15 held by the power source holder ED16 is lower than the remaining-level threshold LVT1 in the case where the remaining level LV1 is lower than the remaining-level threshold LVT1 if needed or desired. As seen in FIG. 12, the output unit ED17 can be configured to be free of outputting, in response to the user input operation U1, second information INF12 indicating that the remaining level LV1 of the electric power source ED15 held by the power source holder ED16 is higher than the remaining-level threshold LVT1 in the case where the remaining level LV1 is higher than the remaining-level threshold LVT1 if needed or desired. In the modification depicted in FIGS. 11 and 12, the signal SG can be free of the remaining-level information INFL2 relating to the remaining level LV2 of the electric power source RD5 of the electric device RD.

In the above embodiments and the modifications thereof, the operating device ED1 wirelessly communicates with the electric device RD via the wireless communicator WC11 and the additional wireless communicator WC21. However, the operating device ED1 can be electrically connected to the electric device RD via an electric cable if needed or desired. In such modifications, the communicator circuitry WC1 includes a wired communicator configured to communicate with another wired communicator via an electric cable. The additional communicator circuitry WC2 includes an additional wired communicator configured to communicate with another wired communicator via an electric cable.

The structure of the operating device ED1 in accordance with each of the embodiments and the modifications thereof can be applied to each of the operating devices ED2, ED3, ED4, ED5, ED6, and ED7. The structure of the electric device RD in accordance with each of the embodiments and the modifications thereof can be applied to each of the electric devices FS, RS, DU, FB, RB, and AS. Thus, the description regarding the operating device ED1 can be utilized as the description of each of the operating devices ED2, ED3, ED4, ED5, ED6, and ED7 by replacing the reference numeral "ED1" with "ED2," "ED3," "ED4," "ED5," "ED6," or "ED7." The description regarding the electric device RD can be utilized as the description of each of the electric devices FS, RS, DU, FB, RB, and AS by replacing the reference numeral "RD" with "FS," "RS," "DU," "FB," "RB," or "AS."

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device of a human-powered vehicle, the operating device comprising:
   a base structure mountable to the human-powered vehicle;
   an operating member movable relative to the base structure in response to a user input operation; and
   an output unit configured to output, in response to the user input operation, first information indicating that a remaining level of an electric power source is lower than a remaining-level threshold in a case where the remaining level is lower than the remaining-level threshold, the output unit being configured to be free of outputting, in response to the user input operation, second information indicating that the remaining level of the electric power source is higher than the remaining-level threshold in a case where the remaining level is higher than the remaining-level threshold.

2. The operating device according to claim 1, wherein the output unit includes an indicator,
   the indicator is configured to indicate the first information in response to the user input operation in the case where the remaining level is lower than the remaining-level threshold, and
   the indicator is configured to be free of indicating the second information in response to the user input operation in the case where the remaining level is higher than the remaining-level threshold.

3. The operating device according to claim 2, wherein the indicator is configured to emit light to indicate the first information in response to the user input operation in the case where the remaining level is lower than the remaining-level threshold, and
   the indicator is configured to be free of emitting light in response to the user input operation in the case where the remaining level is higher than the remaining-level threshold.

4. The operating device according to claim 1, further comprising
   electronic controller circuitry electrically connected to the output unit to control the output unit based on the user input operation and the remaining level of the electric power source.

5. The operating device according to claim 1, further comprising
   a power source holder configured to hold the electric power source, wherein
   the output unit is configured to output, in response to the user input operation, the first information indicating that the remaining level of the electric power source held by the power source holder is lower than the remaining-level threshold in the case where the remaining level is lower than the remaining-level threshold, and
   the output unit is configured to be free of outputting, in response to the user input operation, the second information indicating that the remaining level of the electric power source held by the power source holder is higher than the remaining-level threshold in the case where the remaining level is higher than the remaining-level threshold.

6. The operating device according to claim 1, further comprising
   communicator circuitry configured to transmit a control signal to an electric device in response to the user input operation.

7. The operating device according to claim 6, wherein the communicator circuitry includes a wireless communicator, and
   the wireless communicator is configured to wirelessly transmit the control signal to the electric device in response to the user input operation.

8. The operating device according to claim 7, wherein the electric device includes the electric power source, and the wireless communicator is configured to wirelessly receive remaining-level information relating to the remaining level of the electric power source of the electric device.

9. An operating device of a human-powered vehicle, the operating device comprising:
- a base structure mountable to the human-powered vehicle;
- an operating member movable relative to the base structure in response to a user input operation;
- a wireless communicator configured to wirelessly transmit a control signal to an electric device in response to the user input operation, the wireless communicator being configured to wirelessly receive remaining-level information relating to a remaining level of an electric power source of the electric device; and
- an output unit configured to output, in response to the user input operation, information indicating the remaining level of the electric power source.

10. The operating device according to claim 9, wherein the output unit is configured to output, in response to the user input operation, first information indicating that the remaining level of the electric power source is lower than the remaining-level threshold in a case where the remaining level is lower than the remaining-level threshold.

11. The operating device according to claim 9, wherein the output unit is configured to output, in response to the user input operation, second information indicating that the remaining level of the electric power source is higher than the remaining-level threshold in a case where the remaining level is higher than the remaining-level threshold.

12. The operating device according to claim 8, wherein the wireless communicator is configured to wirelessly receive a signal including the remaining-level information from the electric device.

13. The operating device according to claim 12, wherein the wireless communicator is configured to wirelessly receive the signal which is wirelessly transmitted from the electric device in response to the control signal.

14. The operating device according to claim 8, wherein the electric device includes a gear changer including the electric power source, and
the wireless communicator is configured to wirelessly receive the remaining-level information relating to the remaining level of the electric power source of the gear changer.

15. The operating device according to claim 14, wherein the gear changer includes a rear derailleur including the electric power source, and
the wireless communicator is configured to wirelessly receive the remaining-level information relating to the remaining level of the electric power source of the rear derailleur.

* * * * *